US011669170B2

(12) United States Patent
Dormody et al.

(10) Patent No.: US 11,669,170 B2
(45) Date of Patent: Jun. 6, 2023

(54) SYSTEMS AND METHODS FOR DETERMINING CONTEXTS OF MOBILE DEVICES

(71) Applicant: NextNav, LLC, Sunnyvale, CA (US)

(72) Inventors: Michael Dormody, San Jose, CA (US); Arun Raghupathy, Bangalore (IN); Badrinath Nagarajan, South San Francisco, CA (US); Guiyuan Han, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 17/644,918

(22) Filed: Dec. 17, 2021

(65) Prior Publication Data

US 2022/0107690 A1 Apr. 7, 2022

Related U.S. Application Data

(63) Continuation of application No. 15/930,304, filed on May 12, 2020, now Pat. No. 11,204,646.

(60) Provisional application No. 62/891,069, filed on Aug. 23, 2019.

(51) Int. Cl.
*G06F 3/01* (2006.01)
*H04M 1/72457* (2021.01)
(Continued)

(52) U.S. Cl.
CPC .............. *G06F 3/017* (2013.01); *G01P 15/02* (2013.01); *G06F 3/041* (2013.01);
(Continued)

(58) Field of Classification Search
CPC ....... H04W 4/029; H04W 4/027; H04W 4/80; H04W 4/33; H04W 4/02; H04W 4/021;
(Continued)

(56) References Cited

U.S. PATENT DOCUMENTS

2011/0106449 A1 5/2011 Chowdhary et al.
2012/0072110 A1 3/2012 Venkatraman
(Continued)

FOREIGN PATENT DOCUMENTS

JP 2013200156 A 10/2013

OTHER PUBLICATIONS

Form PCT/ISA/220, PCT/US2020/032531, "Notification of Transmittal", 1 page(s);Form PCT/ISA/210, PCT/US2020/032531, "International Search Report", 4 page(s);EPO Form P04A42, PCT/ US2020/ 032531, "Information or Search Strategy", 1 page(s);Form PCT/ ISA/237, PCT/ US2020/032531, "Written Opinion of the International Searching Authority", 8 pages, dated Aug. 26, 2020.
(Continued)

*Primary Examiner* — Kwasi Karikari
(74) *Attorney, Agent, or Firm* — MLO, a professional corp.

(57) ABSTRACT

Determining contexts of mobile devices. Particular embodiments described herein include machines that determine two estimated positions of a mobile device that respectively correspond to first and second locations at first and second times, acquire sets of terrain or structural information for first and second areas that respectively include the first and second estimated positions, use the acquired sets of information and the estimated positions to determine if the mobile device was near or within a structure at the first and second times, determine one or more values that are indicative of vertical movement by the mobile device during a period of time between the first time and the second time, compare the one or more values to one or more threshold conditions, and determine a context of the mobile device based on the comparison.

20 Claims, 22 Drawing Sheets

(51) Int. Cl.
*H04M 1/72403* (2021.01)
*H04M 1/72454* (2021.01)
*G01P 15/02* (2013.01)
*G06F 3/041* (2006.01)
*H04N 21/45* (2011.01)
*H04W 4/021* (2018.01)

(52) U.S. Cl.
CPC ... *H04M 1/72403* (2021.01); *H04M 1/72454* (2021.01); *H04M 1/72457* (2021.01); *H04N 21/4524* (2013.01); *H04W 4/021* (2013.01)

(58) Field of Classification Search
CPC ..... H04W 4/023; H04W 4/025; H04W 64/00; H04W 64/006; H04W 4/40; H04W 4/38; H04W 4/026; H04W 88/02; H04W 4/30; H04W 4/024; H04W 4/90; H04W 84/18; H04W 12/65; H04W 40/20; H04W 52/0209; H04W 12/33; H04W 64/003
See application file for complete search history.

(56) References Cited

U.S. PATENT DOCUMENTS

| | | |
|---|---|---|
| 2014/0188381 A1 | 7/2014 | Saitoh |
| 2015/0192414 A1* | 7/2015 | Das .......................... G01C 5/06 73/384 |
| 2015/0247917 A1 | 9/2015 | Gum et al. |
| 2015/0249907 A1* | 9/2015 | Gupta ..................... H04W 4/33 455/456.1 |
| 2016/0356593 A1 | 12/2016 | Huang et al. |

OTHER PUBLICATIONS

Notice of Allowance and Fees dated Aug. 9, 2021 for U.S. Appl. No. 15/930,304.
Office Action dated Feb. 25, 2021 for U.S. Appl. No. 15/930,304.
Sankaran, et al., Using Mobile Phone Barometer for Low-Power Transportation Context Detection, Nov. 2014, 15 pgs, ACM, Memphis, TN.

* cited by examiner

> When a determination is made that the mobile device was within a building at the first time, and a determination is made that the mobile device was within the building or a neighboring building at the second time

---

Determining one or more values comprises determining: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time (step 370a)

---

Comparing the one or more values indicative of vertical movement to one or more threshold conditions comprises: (a) determining if a magnitude of the difference in pressure (i) is above a first pressure difference threshold or (ii) is not above the first pressure difference threshold but is above a second pressure difference threshold; (b) determining if a magnitude of the rate of pressure change (i) is above a first pressure change threshold or (ii) is not above the first pressure change threshold but is above a second pressure change threshold; and/or (c) determining if a magnitude of the amount of vertical acceleration (i) is above a first vertical acceleration threshold or (ii) is not above the first vertical acceleration threshold but is above a second vertical acceleration threshold (step 380a)

---

Determining the context comprises: determining that the mobile device is on an elevator when the one or more results indicate one or more of (a) the magnitude of the difference in pressure is above the first pressure difference threshold, (b) the magnitude of the rate of pressure change is above the first pressure change threshold, and/or (c) the magnitude of the amount of vertical acceleration is above the first vertical acceleration threshold; and/or determining that the mobile device is on an escalator when the one or more results indicate one or more of (a) the magnitude of the difference in pressure is not above the first pressure difference threshold but is above the second pressure difference threshold, (b) the magnitude of the rate of pressure change is not above the first pressure change threshold but is above the second pressure change threshold, and/or (c) the magnitude of the amount of vertical acceleration is not above the first vertical acceleration threshold but is above the second vertical acceleration threshold (step 390a)

FIG. 3A

When a determination is made that the mobile device was within a pathway or a ramp at the first time, and a determination is made that the mobile device was within the ramp at the second time Determining one or more values comprises determining: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time (step 370b)

Comparing the one or more values indicative of vertical movement to one or more threshold conditions comprises: (a) determining if a magnitude of the difference in pressure (i) is above a first pressure difference threshold or (ii) is not above the first pressure difference threshold but is above a second pressure difference threshold; (b) determining if a magnitude of the rate of pressure change (i) is above a first pressure change threshold or (ii) is not above the first pressure change threshold but is above a second pressure change threshold; and/or (c) determining if a magnitude of the amount of vertical acceleration (i) is above a first vertical acceleration threshold or (ii) is not above the first vertical acceleration threshold but is above a second vertical acceleration threshold (step 380b)

Determining the context comprises: determining that the mobile device is driving on a ramp (e.g., highway ramp) when the one or more results indicate one or more of (a) the magnitude of the difference in pressure is above the first pressure difference threshold, (b) the magnitude of the rate of pressure change is above the first pressure change threshold, and/or (c) the magnitude of the amount of vertical acceleration is above the first vertical acceleration threshold; and/or determining that the mobile device is walking on a ramp (e.g., along a roadway) when the one or more results indicate one or more of (a) the magnitude of the difference in pressure is not above the first pressure difference threshold but is above the second pressure difference threshold, (b) the magnitude of the rate of pressure change is not above the first pressure change threshold but is above the second pressure change threshold, and/or (c) the magnitude of the amount of vertical acceleration is not above the first vertical acceleration threshold but is above the second vertical acceleration threshold (step 390b)

FIG. 3B

*When a determination is made that the mobile device was within a pathway or a bridge or an overpass at the first time, and a determination is made that the mobile device was within the bridge or the overpass at the second time*

Determining one or more values comprises determining: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time (step 370c)

Comparing the one or more values indicative of vertical movement to one or more threshold conditions comprises: (a) determining if the difference in pressure is below a pressure difference threshold; (b) determining if the rate of pressure change is below a pressure change threshold; and/or (c) determining if the amount of vertical acceleration is above a vertical acceleration threshold (step 380c)

Determining the context comprises: determining that the mobile device is on the bridge or the overpass when the one or more results indicate one or more of (a) the difference in pressure is below the pressure difference threshold, (b) the rate of pressure change is below the pressure change threshold, and/or (c) the amount of vertical acceleration is above the vertical acceleration threshold (step 390c)

FIG. 3C

When a determination is made that the mobile device was within a pathway or an underpass at the first time, and a determination is made that the mobile device was within the underpass at the second time Determining one or more values comprises determining: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time, and/or (c) a third value indicative of vertical movement that is an amount of vertical acceleration measured by the inertial sensor of the mobile device during the period of time (step 370d)

Comparing the one or more values indicative of vertical movement to one or more threshold conditions comprises: (a) determining if the difference in pressure is above a pressure difference threshold (b) determining if the rate of pressure change is above a pressure change threshold, and/or (c) determining if the amount of vertical acceleration is below a vertical acceleration threshold (step 380d)

Determining the context comprises: determining that the mobile device is on the underpass when the one or more results indicate one or more of (a) the difference in pressure is above the pressure difference threshold, (b) the rate of pressure change is above the pressure change threshold, and/or (c) the amount of vertical acceleration is below the vertical acceleration threshold (step 390d)

FIG. 3D

*When a determination is made that the mobile device was within a pathway or a bridge or an overpass at the first time, and a determination is made that the mobile device was within the bridge or the overpass at the second time*

Determining one or more values comprises determining: a value indicative of vertical movement that is a difference in terrain altitude between a first altitude of terrain at the latitude and longitude of the first estimated position and a second altitude of terrain at the latitude and longitude of the second estimated position (step 370e)

Comparing the one or more values indicative of vertical movement to one or more threshold conditions comprises: determining if the difference in terrain altitude is below a terrain altitude difference threshold (step 380e)

Determining the context comprises: determining that the mobile device is on the bridge or the overpass when the one or more results indicate the difference in terrain altitude is below the terrain altitude difference threshold (step 390e)

FIG. 3E

When a determination is made that the mobile device was within a pathway or an underpass at the first time, and a determination is made that the mobile device was within the underpass at the second time Determining one or more values comprises determining: a value indicative of vertical movement that is a difference in terrain altitude between a first altitude of terrain at the latitude and longitude of the first estimated position and a second altitude of terrain at the latitude and longitude of the second estimated position (step 370f)

Comparing the one or more values indicative of vertical movement to one or more threshold conditions comprises: determining if the difference in terrain altitude is above a terrain altitude difference threshold (step 380f)

Determining the context comprises: determining that the mobile device is on the underpass when the one or more results indicate the difference in terrain altitude is above the terrain altitude difference threshold (step 390f)

FIG. 3F

*When a determination is made that the mobile device was within a pathway or a bridge or an overpass at the first time, and a determination is made that the mobile device was within the bridge or the overpass at the second time*

Determining one or more values comprises determining: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; (c) a third value indicative of vertical movement that is an amount of vertical acceleration measured by the inertial sensor of the mobile device during the period of time; and/or (d) a fourth value indicative of vertical movement that is a difference in terrain altitude between a first altitude of terrain at the latitude and longitude of the first estimated position and a second altitude of terrain at the latitude and longitude of the second estimated position (step 370g)

Comparing the one or more values indicative of vertical movement to one or more threshold conditions comprises: (i) determining if the difference in pressure is below a first pressure difference threshold when the difference in terrain altitude is below a first terrain altitude difference threshold; (ii) determining if the difference in terrain altitude is below a second terrain altitude difference threshold when the difference in pressure is not below a second pressure difference threshold; (iii) determining if the rate of pressure change is below a first pressure change threshold when the difference in terrain altitude is below the first terrain altitude difference threshold; (iv) determining if the difference in terrain altitude is below the second terrain altitude difference threshold when the rate of pressure change is not below a second pressure change threshold; (v) determining if the amount of vertical acceleration is above a first vertical acceleration threshold when the difference in terrain altitude is below the first terrain altitude difference threshold; and/or (vi) determining if the difference in terrain altitude is below the second terrain altitude difference threshold when the amount of vertical acceleration is not below a second vertical acceleration threshold (step 380g)

Determining the context comprises: determining that the mobile device is on the bridge or the overpass when the one or more results indicate one or more of (i) the difference in pressure is below the first pressure difference threshold when the difference in terrain altitude is below the first terrain altitude difference threshold, (ii) the difference in terrain altitude is below a second terrain altitude difference threshold when the difference in pressure is not below the second pressure difference threshold, (iii) the rate of pressure change is below the first pressure change threshold when the difference in terrain altitude is below the first terrain altitude difference threshold, (iv) the difference in terrain altitude is below the second terrain altitude difference threshold when the rate of pressure change is not below the second pressure change threshold, (v) the amount of vertical acceleration is above the first vertical acceleration threshold when the difference in terrain altitude is below the first terrain altitude difference threshold, and/or (vi) the difference in terrain altitude is below the second terrain altitude difference threshold when the amount of vertical acceleration is not below the second vertical acceleration threshold (step 390g)

FIG. 3G

When a determination is made that the mobile device was within a pathway or an underpass at the first time, and a determination is made that the mobile device was within the underpass at the second time Determining one or more values comprises determining: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; (c) a third value indicative of vertical movement that is an amount of vertical acceleration measured by the inertial sensor of the mobile device during the period of time; and/or (d) a fourth value indicative of vertical movement that is a difference in terrain altitude between a first altitude of terrain at the latitude and longitude of the first estimated position and a second altitude of terrain at the latitude and longitude of the second estimated position (step 370h)

Comparing the one or more values indicative of vertical movement to one or more threshold conditions comprises: (i) determining if the difference in pressure is above a first pressure difference threshold when the difference in terrain altitude is not below a first terrain altitude difference threshold; (ii) determining if the difference in terrain altitude is above a second terrain altitude difference threshold when the difference in pressure is not above a second pressure difference threshold; (iii) determining if the rate of pressure change is above a first pressure change threshold when the difference in terrain altitude is not below the first terrain altitude difference threshold; (iv) determining if the difference in terrain altitude is above the second terrain altitude difference threshold when the rate of pressure change is not above a second pressure change threshold; (v) determining if the amount of vertical acceleration is below a first vertical acceleration threshold when the difference in terrain altitude is not below the first terrain altitude difference threshold; and/or (vi) determining if the difference in terrain altitude is above the second terrain altitude difference threshold when the amount of vertical acceleration is not above a second vertical acceleration threshold (step 380h)

Determining the context comprises: determining that the mobile device is on the underpass when the one or more results indicate one or more of (i) the difference in pressure is above the first pressure difference threshold when the difference in terrain altitude is not below the first terrain altitude difference threshold, (ii) the difference in terrain altitude is above a second terrain altitude difference threshold when the difference in pressure is not above the second pressure difference threshold, (iii) the rate of pressure change is above the first pressure change threshold when the difference in terrain altitude is not below the first terrain altitude difference threshold, (iv) the difference in terrain altitude is above the second terrain altitude difference threshold when the rate of pressure change is not above the second pressure change threshold, (v) the amount of vertical acceleration is below the first vertical acceleration threshold when the difference in terrain altitude is not below the first terrain altitude difference threshold, and/or (vi) the difference in terrain altitude is above the second terrain altitude difference threshold when the amount of vertical acceleration is not above the second vertical acceleration threshold (step 390h)

FIG. 3H

When a determination is made that the mobile device was within a pathway or a tunnel at the first time, and a determination is made that the mobile device was within the tunnel at the second time Determining one or more values comprises determining: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time (step 370i)

Comparing the one or more values indicative of vertical movement to one or more threshold conditions comprises: (a) determining if the difference in pressure is above a pressure difference threshold; (b) determining if the rate of pressure change is above a pressure change threshold; and/or (c) determining if the amount of vertical acceleration is below a vertical acceleration threshold (step 380i)

Determining the context comprises: determining that the mobile device is in the tunnel when the one or more results indicate one or more of (a) the difference in pressure is above the pressure difference threshold, (b) the rate of pressure change is above the pressure change threshold, and/or (c) the amount of vertical acceleration is below the vertical acceleration threshold (step 390i)

FIG. 3I

When a determination is made that the mobile device was within a pathway or a tunnel at the first time, and a determination is made that the mobile device was within the tunnel at the second time Determining one or more values comprises determining: a value indicative of vertical movement that is a difference in terrain altitude between a first altitude of terrain at the latitude and longitude of the first estimated position and a second altitude of terrain at the latitude and longitude of the second estimated position (step 370j)

Comparing the one or more values indicative of vertical movement to one or more threshold conditions comprises: determining if the difference in terrain altitude is above a terrain altitude difference threshold (step 380j)

Determining the context comprises: determining that the mobile device is in the tunnel when the one or more results indicate the difference in terrain altitude is above the terrain altitude difference threshold (step 390j)

FIG. 3J

*When a determination is made that the mobile device was within a pathway or a tunnel at the first time, and a determination is made that the mobile device was within the tunnel at the second time*

Determining one or more values comprises determining: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; (c) a third value indicative of vertical movement that is an amount of vertical acceleration measured by the inertial sensor of the mobile device during the period of time; and/or (d) a fourth value indicative of vertical movement that is a difference in terrain altitude between a first altitude of terrain at the latitude and longitude of the first estimated position and a second altitude of terrain at the latitude and longitude of the second estimated position (step 370k)

Comparing the one or more values indicative of vertical movement to one or more threshold conditions comprises: (i) determining if the difference in pressure is above a first pressure difference threshold when the difference in terrain altitude is not below a first terrain altitude difference threshold; (ii) determining if the difference in terrain altitude is above a second terrain altitude difference threshold when the difference in pressure is not below a second pressure difference threshold; (iii) determining if the rate of pressure change is above a first pressure change threshold when the difference in terrain altitude is not below the first terrain altitude difference threshold; (iv) determining if the difference in terrain altitude is above the second terrain altitude difference threshold when the rate of pressure change is not below a second pressure change threshold; (v) determining if the amount of vertical acceleration is below a first vertical acceleration threshold when the difference in terrain altitude is not below the first terrain altitude difference threshold; and/or (vi) determining if the difference in terrain altitude is above the second terrain altitude difference threshold when the amount of vertical acceleration is not above a second vertical acceleration threshold (step 380k)

Determining the context comprises: determining that the mobile device is in the tunnel when the one or more results indicate one or more of (i) the difference in pressure is above the first pressure difference threshold when the difference in terrain altitude is not below the first terrain altitude difference threshold, (ii) the difference in terrain altitude is above a second terrain altitude difference threshold when the difference in pressure is not below the second pressure difference threshold, (iii) the rate of pressure change is above the first pressure change threshold when the difference in terrain altitude is not below the first terrain altitude difference threshold, (iv) the difference in terrain altitude is above the second terrain altitude difference threshold when the rate of pressure change is not below the second pressure change threshold, (v) the amount of vertical acceleration is below the first vertical acceleration threshold when the difference in terrain altitude is not below the first terrain altitude difference threshold, and/or (vi) the difference in terrain altitude is above the second terrain altitude difference threshold when the amount of vertical acceleration is not above the second vertical acceleration threshold (step 390k)

FIG. 3K

*When a determination is made that the mobile device was within a pathway at the first time, and a determination is made that the mobile device was within the pathway or that it is unknown if the mobile device was within the pathway at the second time*

Determining one or more values comprises determining: (a) a difference in pressure between a first measurement of pressure made at the first time and a second measurement of pressure made at the second time by the pressure sensor of the mobile device; (b) a rate of pressure change during the period of time; (c) an amount of vertical acceleration measured by the inertial sensor of the mobile device during the period of time; and/or (d) a difference in terrain altitude between a first altitude at the lat/long of the first estimated position and a second altitude at the lat/long of the second estimated position (step 370l)

Comparing the one or more values indicative of vertical movement to one or more threshold conditions comprises: (i) determining if the difference in terrain altitude is above a first terrain altitude difference threshold when a magnitude of the difference in pressure is below a first pressure difference threshold, a magnitude of the rate of pressure change is below a first pressure change threshold, and/or a magnitude of the amount of vertical acceleration is below a first vertical acceleration threshold; (ii) determining if the difference in terrain altitude is above the first terrain altitude difference threshold when the difference in pressure is above a second pressure difference threshold, the rate of pressure change is above a second pressure change threshold, and/or the amount of vertical acceleration is below a second vertical acceleration threshold; (iii) determining if the difference in terrain altitude is below a second terrain altitude difference threshold when the magnitude of the difference in pressure is below a third pressure difference threshold, the magnitude of the rate of pressure change is below a third pressure change threshold, and/ or a magnitude of the amount of vertical acceleration is below a third vertical acceleration threshold, where magnitude accounts for fluctuations of pressure stemming from a pressure sensor that does not significantly change; (iv) determining if the difference in terrain altitude is between the first terrain altitude difference threshold and the second terrain altitude difference threshold when the magnitude of the difference in pressure is above a fourth pressure difference threshold, the magnitude of the rate of pressure change is above a fourth pressure change threshold, and/or the magnitude of the amount of vertical acceleration is above a fourth vertical acceleration threshold, where magnitude accounts for both ramps that go up from a road and ramps that go down from a road; and/or (v) determining if the difference in terrain altitude is between the first terrain altitude difference threshold and the second terrain altitude difference threshold when the difference in pressure is above a fifth pressure difference threshold, the rate of pressure change is above a fifth pressure change threshold, and/or the amount of vertical acceleration is below a fifth vertical acceleration threshold (step 380l)

*Continued to step 390l on next sheet*

FIG. 3LA

*Continued from step 380l on previous sheet*

Determining the context comprises: determining that the mobile device is (i) in a tunnel when the difference in terrain altitude is above the first terrain altitude difference threshold when the magnitude of the difference in pressure is below the first pressure difference threshold, the magnitude of the rate of pressure change is below the first pressure change threshold, and/or the magnitude of the amount of vertical acceleration is below the first vertical acceleration threshold, (ii) on an underpass when the difference in terrain altitude is above the first terrain altitude difference threshold when the difference in pressure is above the second pressure difference threshold, the rate of pressure change is above the second pressure change threshold, and/or the amount of vertical acceleration is below a second vertical acceleration threshold, (iii) on a bridge or an overpass when difference in terrain altitude is below a second terrain altitude difference threshold when the magnitude of the difference in pressure is below the third pressure difference threshold, the magnitude of the rate of pressure change is below the third pressure change threshold, and/or the magnitude of the amount of vertical acceleration is below the third vertical acceleration threshold, (iv) on a ramp when the difference in terrain altitude is between the first terrain altitude difference threshold and the second terrain altitude difference threshold when the magnitude of the difference in pressure is above the fourth pressure difference threshold, the magnitude of the rate of pressure change is above the fourth pressure change threshold, and/or the magnitude of the amount of vertical acceleration is above the fourth vertical acceleration threshold, and/or (v) underground when the difference in terrain altitude is between the first terrain altitude difference threshold and the second terrain altitude difference threshold when the difference in pressure is above the fifth pressure difference threshold, the rate of pressure change is above the fifth pressure change threshold, and/or the amount of vertical acceleration is below the fifth vertical acceleration threshold (step 390l)

FIG. 3LB

When a determination is made that the mobile device was within a pathway at the first time, and a determination is made that the mobile device was within a building at the second time Determining one or more values comprises determining: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time (step 370m)

Comparing the one or more values indicative of vertical movement to one or more threshold conditions comprises: (a) determining if the difference in pressure is above a pressure difference threshold; (b) determining if the rate of pressure change is above a pressure change threshold; and/or (c) determining if the amount of vertical acceleration is below a vertical acceleration threshold (step 380m)

Determining the context comprises: determining that the mobile device is underground when the one or more results indicate one or more of (a) the difference in pressure is above the pressure difference threshold, (b) the rate of pressure change is above the pressure change threshold, and/or (c) the amount of vertical acceleration is below the vertical acceleration threshold (step 390m)

FIG. 3M

When a determination is made that the mobile device was not within a building or a pathway at the first time (e.g., FIG. 2E)

Determining one or more values comprises determining: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time (step 370n)

Comparing the one or more values indicative of vertical movement to one or more threshold conditions comprises: (a) determining if the difference in pressure is above a pressure difference threshold; (b) determining if the rate of pressure change is above a pressure change threshold; and/or (c) determining if the amount of vertical acceleration is below a vertical acceleration threshold (step 380n)

Determining the context comprises: determining that the mobile device is underground when the one or more results indicate one or more of (a) the difference in pressure is above the pressure difference threshold, (b) the rate of pressure change is above the pressure change threshold, and/or (c) the amount of vertical acceleration is below the vertical acceleration threshold (step 390n)

FIG. 3N

SYSTEMS AND METHODS FOR DETERMINING CONTEXTS OF MOBILE DEVICES

CROSS-REFERENCE TO RELATED APPLICATIONS

This application is a continuation of U.S. patent application Ser. No. 15/930,304, filed May 12, 2020, which claims priority to U.S. Provisional Patent Application No. 62/891,069, filed Aug. 23, 2019, all of which are hereby incorporated by reference herein in their entirety.

BACKGROUND

The context of a mobile device, such as a smartphone, can be determined using different information that is collected by the mobile device. Examples of contexts include, but are not limited to, determining that the mobile device is in a moving motorized vehicle, is with a user who is traveling between floors of a building, is with a user who is walking, is with a user who is biking, or is still. Different types of information can be collected by a mobile device for use in determining a context of that mobile device. For example, vector movement indicative of particular direction and amount of movement can be estimated using inertial sensor measurements from an accelerometer or other inertial sensor, or some of these movements can be estimated using a series of computed position estimates over time. When a context is determined, a confidence value that estimates the reliability or accuracy of the context can be determined. Confidence values can be represented in different forms, and are usually provided as a percentage, such as 50% confidence, but could be provided in other ways, such as using relative terms like High, Good, Weak, or Poor confidences.

Knowing the context of a mobile device provides useful, general information about a mobile device or the environment around a mobile device. The general information provided by a context can be used to make decisions as to whether certain operations are performed—e.g., whether a pressure sensor of the mobile device can be calibrated, whether pressure information collected by a pressure sensor is unreliable, or other decisions about operations that are typically effective only during certain contexts. Unfortunately, the general nature of the aforementioned contexts lacks specificity needed to represent an estimated position of a mobile device (e.g., estimated latitude, longitude, and/or altitude of a mobile device), where such estimated positions must be accurate to within certain tolerances depending on the use of the estimated position (e.g., with a few meters or less than one meter from the true position of the mobile device when used for emergency response applications). It follows that there is a need for improved approaches that determine more specific contexts of mobile devices that can be used for determining an estimated position of a mobile device, or that can provide better resolution of information used to make decisions as to whether certain operations are performed (e.g., whether a pressure sensor of the mobile device can be calibrated, whether an altitude of a mobile device can be computed using measurements of pressure from a pressure sensor of the mobile device, or other decisions about operations).

BRIEF DESCRIPTION OF THE DRAWINGS

FIG. 3A through FIG. 3N depict different processes for determining particular contexts under different circumstances.

DETAILED DESCRIPTION

Figure 1:
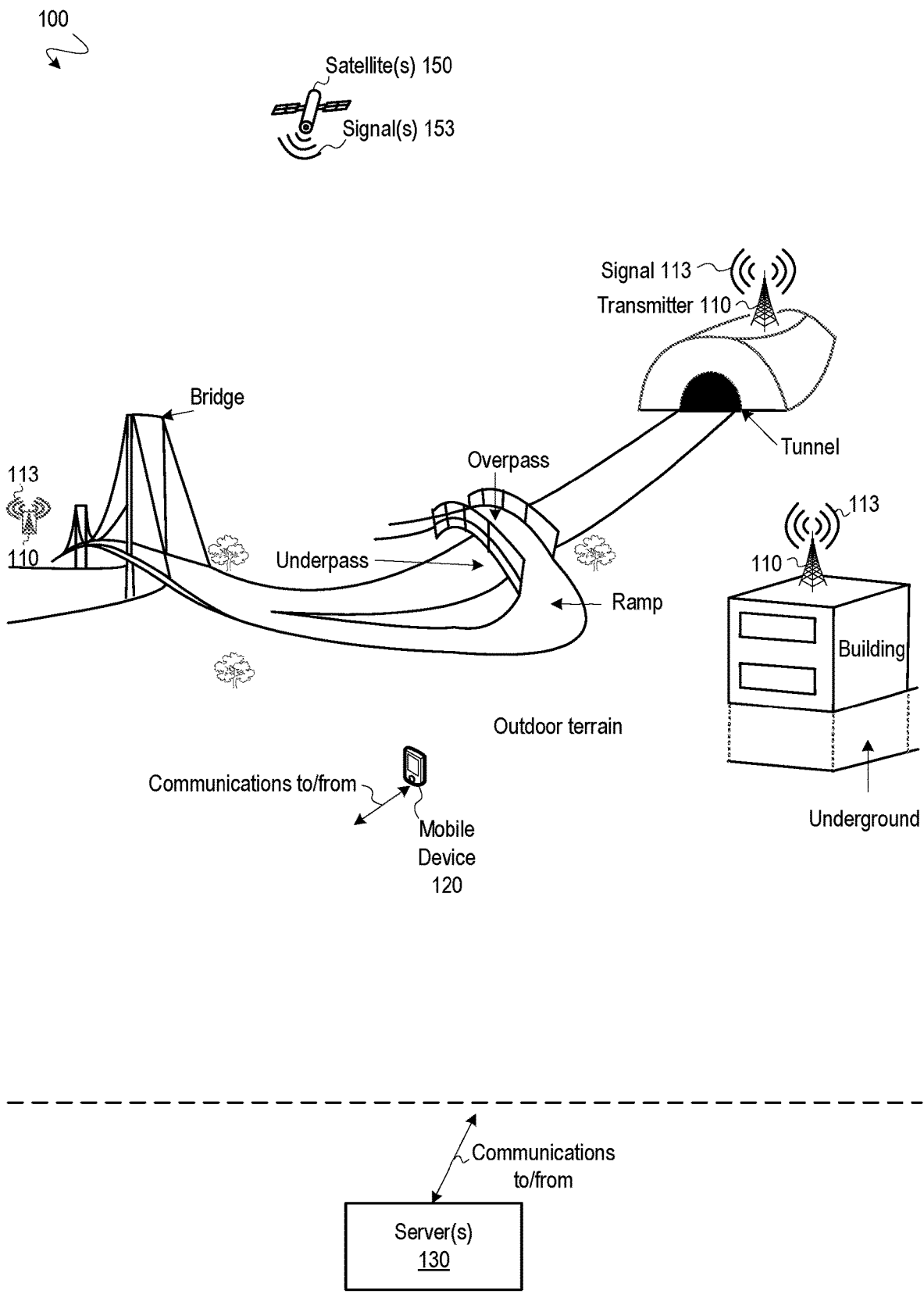
FIG. 1 depicts an operational environment in which systems and methods for determining contexts of mobile devices may operate.

Understanding a context of a mobile device, such as a smartphone, can be used to identify information about a mobile device or the environment around a mobile device. The information provided by typical contexts is general—e.g., the mobile device is in a moving motorized vehicle, is with a user who is traveling between floors of a building, is with a user who is walking, is with a user who is biking, or is still. The general information provided by typical contexts can be used to identify basic circumstances during which certain operations can be performed—e.g., circumstances when calibration of a pressure sensor would be reliable, when pressure information collected by a pressure sensor would be unreliable for use in computing an estimated altitude of a mobile device, or when other operations would or would not yield effective results. However, the general information provided by typical contexts cannot be reliably used for particular operations, such as determining an estimated position of a mobile device, because the information lacks specificity needed to restrict possible positions—e.g., a context specifying a status of a mobile device as moving with a motorized vehicle, moving with a walking user, moving with a biking user, or being still does not define the location of the mobile device. More specific contexts that further refine the information about mobile device or the environment around a mobile device would beneficially expand the usefulness of contexts and advantageously enhance operations of mobile devices and positioning systems in terms of improvements to calibrating pressure sensors of mobile devices, computing positions of mobile devices, and other applications.

As described further below, more specific contexts like building-specific contexts and travel-specific contexts can be determined for a mobile device using information from a pressure sensor of the mobile device, information from an inertial sensor (e.g., an accelerometer, gyroscope, or other inertial sensor) of the mobile device, and/or map data sources for structures and/or terrain in an area in which the mobile device is believed to reside. For reference, information from data sources can be queried by a mobile device or server, and the data sources return the queried information. Terrain data sources typically include altitudes of the ground in an area at particular two-dimensional positions (latitude and longitude), and may include some information about the general existence of man-made structures within terrain (e.g., two-dimensional positions of buildings and transportation pathways without specific details about those structures that may be included in structure data sources). Such terrain data sources can provide information about generic structures without differentiating between different types of structures. Structure data sources typically include specific details about man-made structures (e.g., numbers of floors, altitudes or heights above ground for floors, a footprint, an address, a name, or other details about a particular building; e.g., two-dimensional positions and identities of types of structures like bridges, ramps, overpasses, underpasses, tunnels, underground pathways, aboveground pathways, or other particular types of structures). Such structure data sources can provide information about particular structures by differentiating between different types of structures.

As will be appreciated further in the description that follows, more specific contexts can significantly reduce the number of possible positions of a mobile device during circumstances when computing an estimated position using beacon positioning signals is difficult, such as when multipath or attenuation is affecting the reliability of positioning signals. For instance, if positioning signals are only able to restrict possible positions of a mobile device to inside a large building, more specific contexts specifying the mobile device is traveling in an elevator within the building can be determined using detected changes in pressure and/or detected vertical movements, and a specific area in the building where elevators are located can be determined using a structure map, such as a map of the building. A more specific context identifying travel in an elevator can then be used to slam an estimated two-dimensional position of the mobile device to where the elevators are located, which advantageously reduces emergency response times or other uses of estimated positions. More specific contexts have uses outside of refining estimated positions, including use in determining more opportunities to calibrate pressure sensors of a mobile device.

More specific contexts may include:
1. Traveling up or down in an elevator: when a location of a mobile device is inside a building according to a structure data source, (i) accelerometer measurements indicate a type of movement over a short time scale indicative of movement via an elevator (e.g., vertical movement within a range of expected speeds of elevators over enough time to travel between at least two adjacent floors via an elevator, and optionally horizontal movement within a range of movement allowed within elevators), and (ii) measured changes in pressure correspond to changes in vertical altitude expected for movement via an elevator (e.g., changes in pressure within a range of expected rates of change over enough time to travel between at least two adjacent floors via an elevator). By way of example, expected speeds may include a speed of 2.5 to 3 meters of travel per 3 seconds or less (or any suitable speed depending on the elevator), a range of horizontal movement allowed within elevators may include a maximum of 1.5 meters (or any suitable range depending on the elevator), and expected rates of pressure change may include 25 to 30 Pascals of change per 3 seconds or less (or any suitable rate depending on the elevator).
2. Traveling up or down in an escalator: when a location of a mobile device is inside a building according to a structure data source, (i) accelerometer measurements indicate a type of movement over a short time scale indicative of movement via an escalator (e.g., vertical movement within a range of expected speeds of escalators over enough time to travel between at least two adjacent floors via an escalator, and optionally horizontal movement within a range of movement allowed by escalators), and (ii) measured changes in pressure correspond to changes in vertical altitude expected for movement via an escalator (e.g., changes in pressure within a range of expected rates of change over enough time to travel between at least two adjacent floors via an escalator). By way of example, expected speeds may include a speed of 2.5 to 3 meters of travel per 4 to 5 seconds (or any suitable speed depending on the escalator), a range of horizontal movement allowed within escalators may include a minimum of 4 meters (or any suitable range depending on the escalator), and expected rates of pressure change may include 25 to 30 Pascals of change per 4 to 5 seconds (or any suitable rate depending on the escalator).
3. Traveling up or down a ramp: when a location of a mobile device is near a pathway (e.g., road or walkway) according to a terrain data source, or a ramp (e.g., a ramped road or walkway) according to a structure data source (e.g., where "near" can be measured in different ways, including being within a predefined distance such as 20-50 meters or a different amount of distance), (i) accelerometer measurements indicate a type of movement over a time scale indicative of movement along a ramp via a motorized vehicle or at a walking pace (e.g., vertical movement that is within a threshold amount of distance from a known vertical height or depth of the ramp, and optionally horizontal movement that is within a threshold amount of distance from a known length of the ramp, within a range of expected times to travel the ramp via a motorized vehicle or at a walking pace), and (ii) measured changes in pressure correspond to changes in vertical altitude expected for movement up or down the ramp (e.g., changes in pressure expected for ascending or descending the height or depth of the ramp optionally within a range of expected times to travel the ramp via a motorized vehicle or at a walking pace).
4. Traveling over a bridge or overpass: when a location of a mobile device is near a pathway (e.g., road or walkway) according to a terrain data source, or a bridge or overpass according to a structure data source, where altitudes of the terrain below and around the pathway, bridge or overpass are lower than altitude of the pathway, bridge or overpass, (i) accelerometer measurements indicate two-dimensional movement in the area (and optionally no vertical movement that matches the altitudes of the terrain) during a predefined time that is within a maximum amount of time expected for traversing the overpass, and (ii) pressure measurements indicate no changes in pressure that would be expected if the mobile phone was descending into the lower altitude terrain over the predefined time.
5. Traveling underground: when a location of a mobile device is not within the boundaries of any building according to a structure data source, (i) accelerometer measurements indicate a downward vertical motion, and (ii) pressure measurements indicate increased pressure.
6. Traveling on an underpass that generally follows the contour of flat terrain (e.g., where a structure is above the underpass and terrain): when a location of a mobile device is near a pathway (e.g., road or walkway) according to a terrain data source, or an underpass according to a structure data source, and (i) any changes in pressure measurements, during a predefined time that is within a maximum amount of time expected for traversing the underpass, do not exceed a threshold amount of pressure change that would be expected if the mobile phone ascended to a location above the underpass (e.g., a roadway above the underpass).
7. Traveling on an underpass that descends under a structure: when a location of a mobile device is near a pathway (e.g., road or walkway) according to a terrain data source, or an underpass according to a structure data source, where altitudes of the terrain around the pathway or underpass are generally flat (e.g., within a range of altitudes, such as 1 meter or another range), (i)

accelerometer measurements indicate vertical movement, and (ii) pressure measurements indicate an increase in pressure, during a predefined time that is within a maximum amount of time expected for traversing the underpass, that is within a maximum amount of time expected for traversing the underpass.

8. Traveling through a tunnel: when a location of a mobile device is near a road according to a terrain data source, or a tunnel entrance from a structure data source, where altitudes of terrain above and to the sides of the tunnel are higher than that the tunnel, (i) accelerometer measurements indicate no vertical movement over a threshold amount of movement (e.g., an amount that would be expected if the mobile device ascended to terrain above and to the sides of the tunnel), and (ii) pressure measurements indicate (a) no change in pressure over a threshold amount of pressure (e.g., an amount that would be expected if the mobile device ascended to terrain above and to the sides of the tunnel) and/or (b) a change in pressure within a maximum amount of localized pressure expected to be created by the tunnel during a predefined time that is within a maximum amount of time expected for traversing the tunnel.

Expected or threshold values may be stored in suitable terrain or structure data sources that are accessible for use during processes described herein.

FIG. 1 illustrates an operational environment with examples of particular contexts that can be determined for later use in different applications—e.g., determining an estimated position of a mobile device, or providing better resolution of information used to make decisions as to whether certain operations are performed (e.g., whether a pressure sensor of the mobile device can be calibrated, whether an altitude of a mobile device can be computed using measurements of pressure from a pressure sensor of the mobile device, or other decisions about operations). As shown in FIG. 1, illustrative structures may include a building (in which vertical travel can be detected), a ramp, a bridge, an overpass, an underpass, a tunnel, and an underground area. Outdoor terrain that is not covered by a structure is also shown. FIG. 1 also shows other components that are described later in the 'Other Aspects' section of this disclosure.

Details about different processes for determining contexts of mobile devices are provided below with reference to FIG. 2A through FIG. 3N.

Determining Contexts of Mobile Devices

Different processes for determining a context of a mobile device are discussed below in relation to FIG. 2A through FIG. 2E.

Figure 2A:
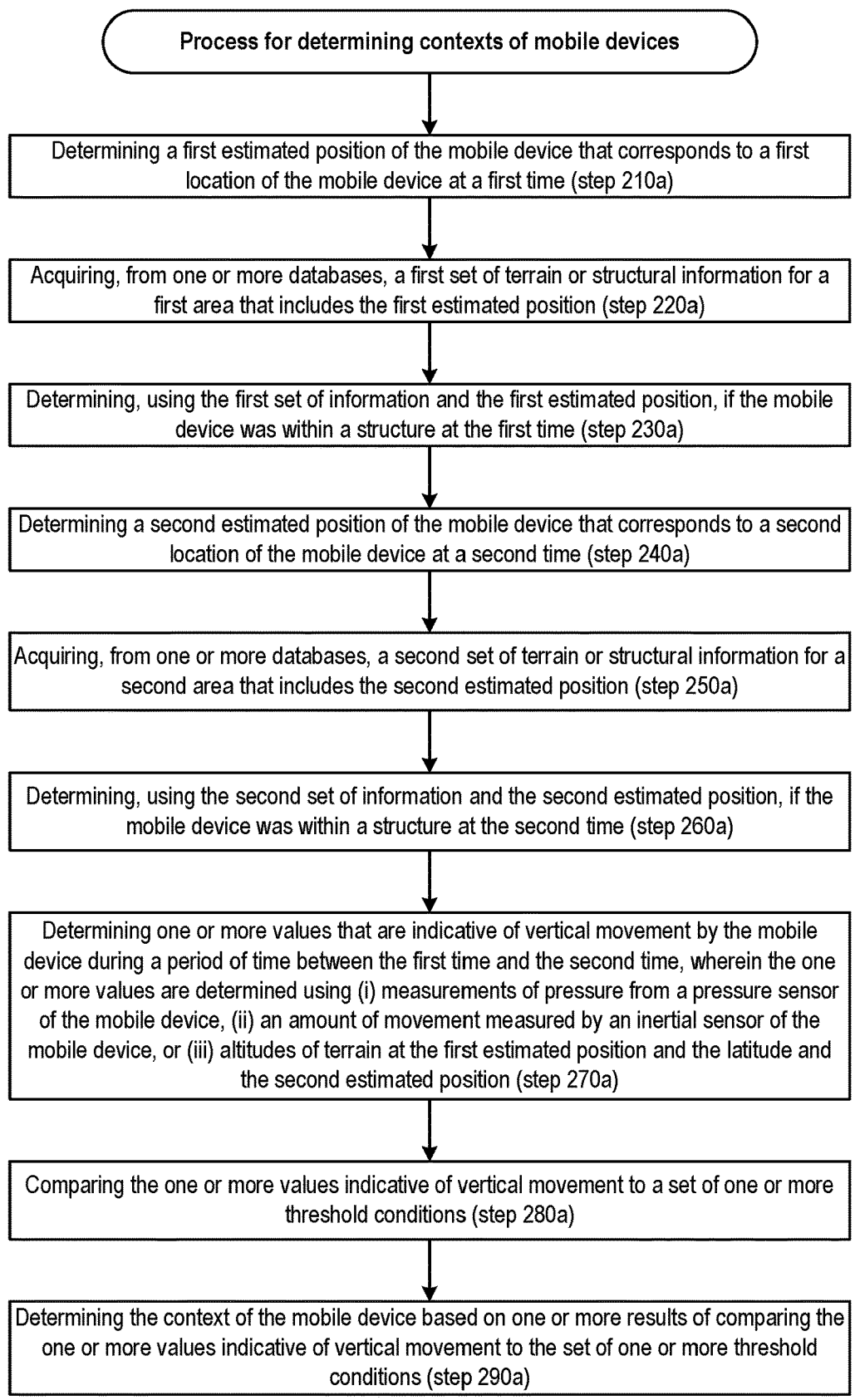
FIG. 2A through FIG. 2E depict different processes for determining contexts of mobile devices.

The process of FIG. 2A can be used under different scenarios, including: (a) when a mobile device is detected to be within structure(s) at two different times; and (b) when the mobile device is not detected to be within a structure at one of the times. When a mobile device is detected to be within structure(s) at two different times, a context can be determined by testing any of four conditions (e.g., acceleration, pressure difference, rate of pressure, and/or difference in terrain altitude). When the mobile device is not detected to be within a structure at a first time, a context can be determined by testing a possibility that the mobile device is underground. Embodiments of the process in FIG. 2A may include: a first embodiment that tests only one condition without testing the other aforementioned conditions; a second embodiment that tests only two aforementioned conditions; a third embodiment that tests only three aforementioned conditions; or a fourth embodiment that tests all four aforementioned conditions. FIG. 2A depicts a process for determining a context of a mobile device in connection with the following steps.

Step 210a comprises determining a first estimated position of the mobile device that corresponds to a first location of the mobile device at a first time, and optionally determining a first confidence value for the first estimated position. In one embodiment, the first time may be an instance in time t1, or a time period lasting up to T1 time units where T1 can vary depending on desired implementation.

Step 220a comprises acquiring, from one or more data sources, a first set of terrain information and/or structural information for a first area that includes the first estimated position. In one embodiment, the first area could consist only of the first estimated position, or an area of possible locations of the mobile device, such as a circular area centered on the first estimated position with a radius based on a confidence value (or possible error in the estimated position) alone or the confidence value (or possible error) scaled by a scaling factor. By way of example, the first set of information may include altitude information for terrain in the first area and/or at least one location of at least one structure in the first area (e.g., where the terrain and/or structure are determined to be in the first area when their lat/long or other positional details are determined to be within the first area).

Step 230a comprises determining, using the first set of information and the first estimated position (and optionally the first confidence value), if the mobile device was within (e.g., inside or on) a structure at the first time. In one embodiment, the structure can be a generic man-made structure specified by a terrain data source (e.g., a general category such as "structure", or alternatively general categories of "building" and "pathway"), or can be a particular man-made structure specified by a structure data source (or a terrain data source if available) such as a particular building, ramp, overpass/bridge, underpass, tunnel, or other particular structure. Terrain data sources store altitudes of the ground in an area, but often only include locations of man-made structures without additional information about the particular type of structure (e.g., building, ramp, overpass/bridge, underpass, tunnel, or other particular structure), so information from terrain data sources about different types of structures in an area is often limited to footprints that man-made structures occupy over ground terrain. Thus, information about structures from terrain data sources is generic. Structure data sources, on the other hand, often include details about different structures in addition to footprints the structures occupy, including details like heights of structures and often the type of structure. Thus, information about structures from structure data sources is particular.

Different approaches can be used to determine that the mobile device was within a structure. In one approach, the mobile device is determined to be within a structure when the estimated position is within a boundary of the structure that was included in the set of information, where a boundary of a structure may be a footprint of a particular building as retrieved from a structure data source, an area of a particular travel pathway (e.g., a ramp, overpass, underpass, or tunnel) as retrieved from a structure data source, or an area of terrain occupied by a generic structure as retrieved from terrain data source. In another approach, the mobile device is determined to be within a structure when at least a predefined percentage of an area of possible locations of the mobile device is within a boundary of a structure that was included in the first set of information. In yet another approach, the mobile device is determined to be within a structure when (i) a determined amount of an area of possible locations of the mobile device that is occupied by a generic or particular structure and optionally other generic or particular structure(s) exceeds a threshold amount of occupation (e.g., 50% or 75% or another percentage of the area of possible locations of the mobile device is occupied) and/or (ii) a size of the structure (or an average size of the generic or particular structure and other generic or particular structure(s)) and a size of the area of possible locations of the mobile device are within a threshold amount of size from each other (e.g., the size of the area of possible locations of the mobile device is less than twice the size of the generic or particular structure or the average size of the generic or particular structure and other generic or particular structure(s)).

Step 240a comprises determining a second estimated position of the mobile device that corresponds to a second location of the mobile device at a second time (e.g., $t2=t1+T$, where T=the period of time), and optionally determining a second confidence value for the second estimated position. For example, the second time may be an instance in time $t2$, or a time period lasting up to T2 time units, where T2 can vary depending on desired implementation and is preferably equal to T1 in at least one embodiment.

Step 250a comprises acquiring, from one or more data sources, a second set of terrain and/or structural information for a second area that includes the second estimated position (where this step is optionally performed only if a determination is made that the mobile device was within a structure at the first time in at least one embodiment). By way of example, the second area could consist only of the second estimated position, or an area of possible locations of the mobile device, such as a circular area centered on the second estimated position with a radius based on a confidence value (or possible error in the estimated position) alone or the confidence value (or possible error) scaled by a scaling factor. The second set of information may include altitude information for terrain in the second area and/or at least one location of at least one structure in the second area (e.g., where the terrain and/or structure are determined to be in the second area when their lat/long or other positional details are determined to be within the second area).

Step 260a comprises determining, using the second set of information and the second estimated position (and optionally the second confidence value), if the mobile device was within a generic structure or a particular structure at the second time (where this step is optionally performed only if the second set of information is acquired in at least one embodiment). The approaches for determining that the mobile device was within a structure at the first time described in relation to step 230a can be used for determining that the mobile device was within a structure at the second time during step 260a.

Step 270a comprises determining one or more values that are indicative of vertical movement by the mobile device during a period of time between the first time and the second time, wherein the one or more values are determined using (i) measurements of pressure from a pressure sensor of the mobile device, (ii) an amount of movement measured by an inertial sensor of the mobile device, and/or (iii) altitudes of terrain at the latitudes and longitudes of the first estimated position and the second estimated position. Vertical movement may be downward (−Z) or upward (+Z), or there may be no vertical movement. In one embodiment when the first time and the second time are time periods T1 and T2, the period of time between the first time and the second time is longer than time period T1, longer than time period T2, and preferably spans at least from the beginning of T1 to the end of T2. Use of time periods instead of instances of time allows for measurements and information to be collected around the same time (e.g., within a few seconds) instead of requiring the measurements and information to be collected at exactly the same instance in time. Values to determine can be selected based on a first determination specifying if the mobile device was within a generic structure or a particular structure at the first time, and a second determination specifying if the mobile device was within a generic structure or a particular structure at the second time. The values to determine can be a default operation, or in response to determining locations of the mobile device at the first and second times, where the latter approach could be more efficient. In different embodiments, one or more values are determined by: (a) determining a first value indicative of vertical movement that is a difference in pressure between a first measurement of pressure made by the pressure sensor of the mobile device at the first time and a second measurement of pressure made by the pressure sensor of the mobile device at the second time; (b) determining a second value indicative of vertical movement that is a rate of pressure change during the period of time (e.g., calculated by dividing a difference in pressure between a first measurement of pressure made by the pressure sensor of the mobile device at the first time and a second measurement of pressure made by the pressure sensor of the mobile device at the second time by an amount of time in the period of time); (c) determining a third value indicative of vertical movement that is an amount of vertical acceleration measured by the inertial sensor of the mobile device during the period of time; and/or (d) determining a fourth value indicative of vertical movement that is a difference in terrain altitude between a first altitude of terrain at the latitude and longitude of the first estimated position and a second altitude of terrain at the latitude and longitude of the second estimated position.

Step 280a comprises comparing the one or more values indicative of vertical movement to a set of one or more threshold conditions. The different threshold conditions can be optionally selected based on a first determination specifying if the mobile device was within a generic structure or a particular structure at the first time, and a second determination specifying if the mobile device was within a generic structure or a particular structure at the second time, where different sets of threshold conditions can be stored in association with different values of the determinations, and retrieved from storage using known approaches for retrieval.

Step 290a comprises determining the context of the mobile device based on one or more results of comparing the one or more values indicative of vertical movement to the set of one or more threshold conditions.

Figure 2B:
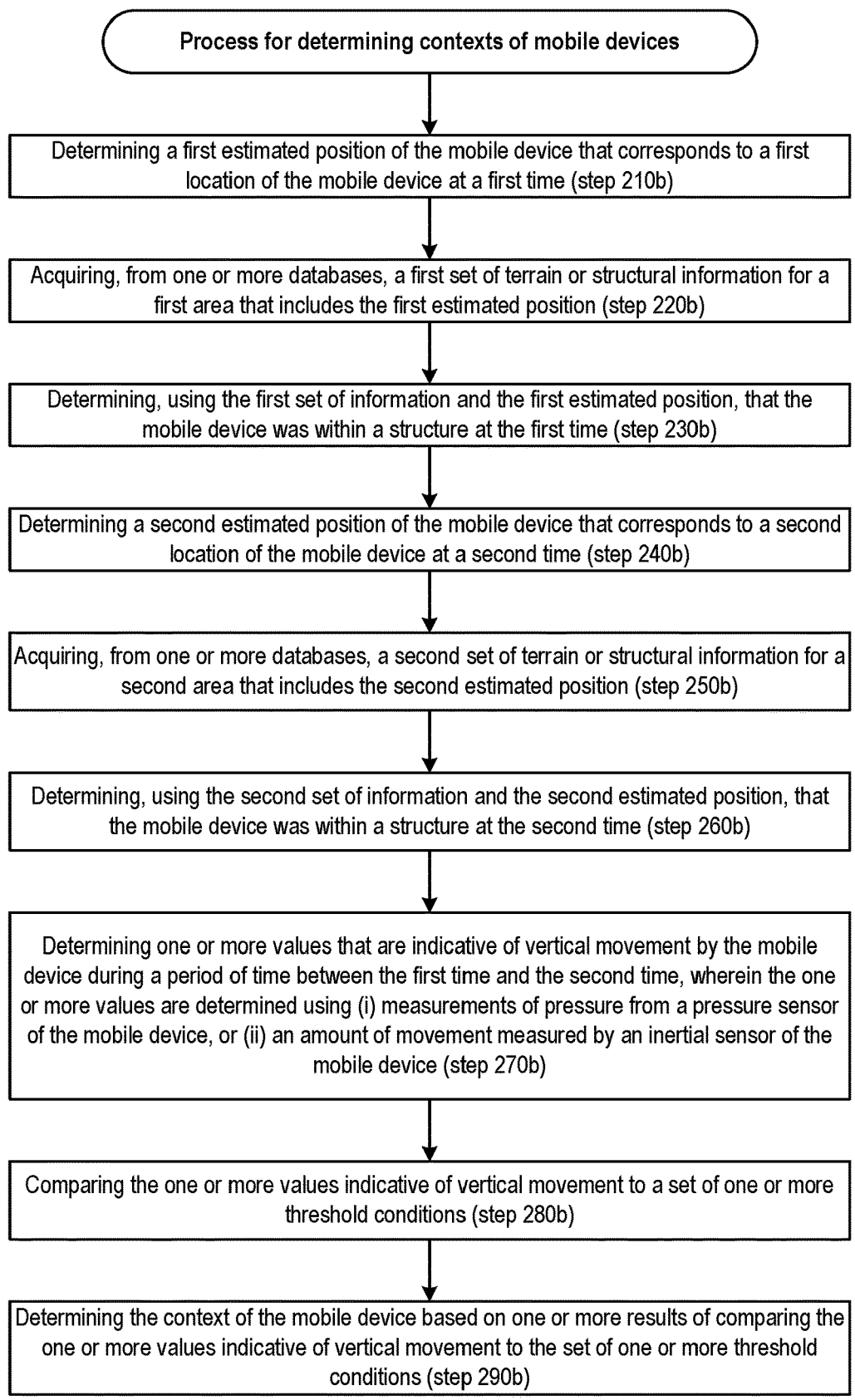

Another process is shown in FIG. 2B. The process of FIG. 2B can be used when a mobile device is detected to be within structure(s) at two different times, after which a context can be determined by testing any of three conditions (e.g., acceleration, pressure difference, and/or rate of pressure), but not testing difference in terrain altitude. Embodiments of the process in FIG. 2B may include: a first embodiment that tests only one of the aforementioned three conditions without testing the other conditions; a second embodiment that tests only two of the aforementioned three conditions; or a third embodiment that tests all three aforementioned conditions. FIG. 2B depicts a process for determining a context of a mobile device in connection with the following steps:

determining a first estimated position of the mobile device that corresponds to a first location of the mobile device at a first time (step 210*b*); acquiring, from one or more data sources, a first set of terrain or structural information for a first area that includes the first estimated position (step 220*b*); determining, using the first set of information and the first estimated position, that the mobile device was within a generic or particular structure at the first time (step 230*b*); determining a second estimated position of the mobile device that corresponds to a second location of the mobile device at a second time (step 240*b*); acquiring, from one or more data sources, a second set of terrain or structural information for a second area that includes the second estimated position (step 250*b*); determining, using the second set of information and the second estimated position, that the mobile device was within a generic or particular structure at the second time (step 260*b*); determining one or more values that are indicative of vertical movement by the mobile device during a period of time between the first time and the second time, wherein the one or more values are determined using (i) measurements of pressure from a pressure sensor of the mobile device, and/or (ii) an amount of movement measured by an inertial sensor of the mobile device (step 270*b*); comparing the one or more values indicative of vertical movement to a set of one or more threshold conditions (step 280*b*); and determining the context of the mobile device based on one or more results of comparing the one or more values indicative of vertical movement to the set of one or more threshold conditions (step 290*b*). In different embodiments of step 270*b*, one or more values are determined by: (a) determining a first value indicative of vertical movement that is a difference in pressure between a first measurement of pressure made by the pressure sensor of the mobile device at the first time and a second measurement of pressure made by the pressure sensor of the mobile device at the second time; (b) determining a second value indicative of vertical movement that is a rate of pressure change during the period of time; and/or (c) determining a third value indicative of vertical movement that is an amount of vertical acceleration measured by the inertial sensor of the mobile device during the period of time.

Figure 2C:
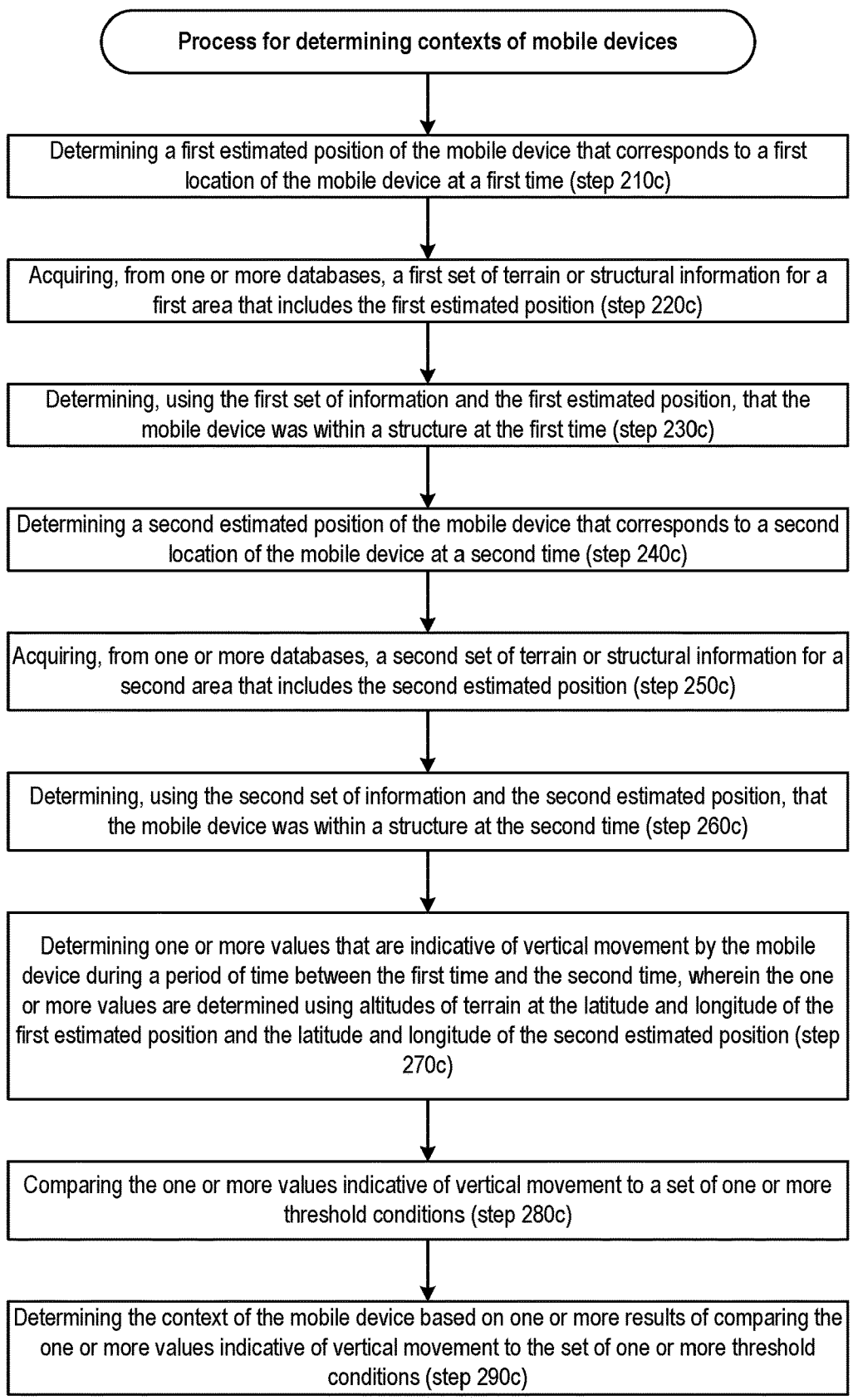

Another process is shown in FIG. 2C. The process of FIG. 2C can be used when a mobile device is detected to be within structure(s) at two different times, after which a context can be determined by testing difference in terrain altitude, but not testing acceleration, pressure difference, or rate of pressure. FIG. 2C depicts a process for determining a context of a mobile device in connection with the following steps: determining a first estimated position of the mobile device that corresponds to a first location of the mobile device at a first time (step 210*c*); acquiring, from one or more data sources, a first set of terrain or structural information for a first area that includes the first estimated position (step 220*c*); determining, using the first set of information and the first estimated position, that the mobile device was within a generic or particular structure at the first time (step 230*c*); determining a second estimated position of the mobile device that corresponds to a second location of the mobile device at a second time (step 240*c*); acquiring, from one or more data sources, a second set of terrain or structural information for a second area that includes the second estimated position (step 250*c*); determining, using the second set of information and the second estimated position, that the mobile device was within a generic or particular structure at the second time (step 260*c*); determining one or more values that are indicative of vertical movement by the mobile device during a period of time between the first time and the second time, wherein the one or more values are determined using altitudes of terrain at the latitude and longitude of the first estimated position and the latitude and longitude of the second estimated position (step 270*c*); comparing the one or more values indicative of vertical movement to a set of one or more threshold conditions (step 280*c*); and determining the context of the mobile device based on one or more results of comparing the one or more values indicative of vertical movement to the set of one or more threshold conditions (step 290*c*). In one embodiment of step 270*c*, one or more values are determined by determining a value indicative of vertical movement that is a difference in terrain altitude between a first altitude of terrain at the latitude and longitude of the first estimated position and a second altitude of terrain at the latitude and longitude of the second estimated position.

Figure 2D:
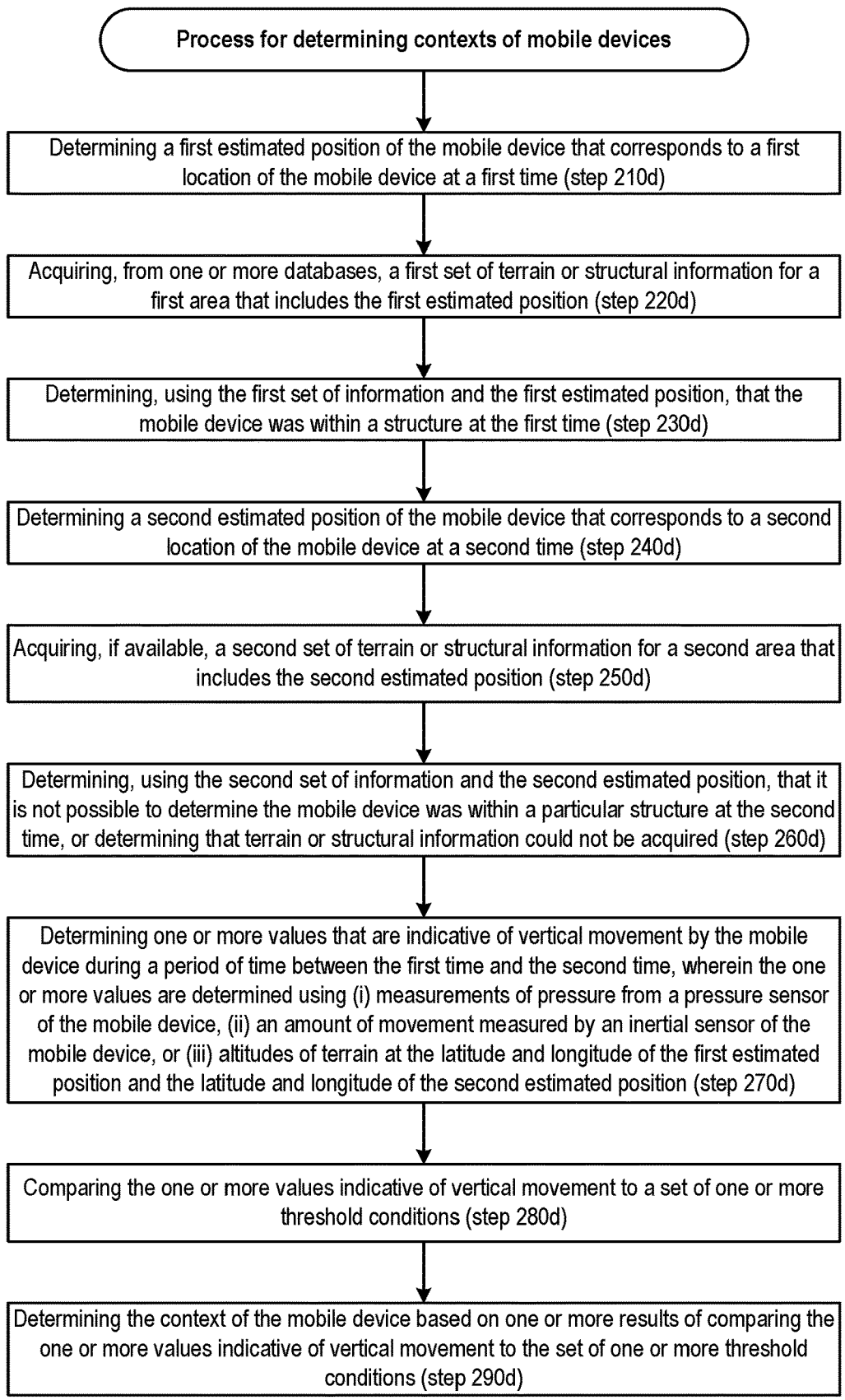

Another process is shown in FIG. 2D. The process of FIG. 2D can be used when a mobile device is detected to be within a generic or particular structure at a first time, and either (i) no structure info is available at a later second time or (ii) the mobile device is not detected to be within a particular structure at the second time, after which a context can be determined by testing difference in terrain altitude and any of three other conditions (e.g., acceleration, pressure difference and/or rate of pressure). Embodiments of the process in FIG. 2D may include: a first embodiment that tests only one of the aforementioned three other conditions; a second embodiment that tests only two of the aforementioned three other conditions; and a third embodiment that tests all of the aforementioned three other conditions. FIG. 2D depicts a process for determining a context of a mobile device in connection with the following steps: determining a first estimated position of the mobile device that corresponds to a first location of the mobile device at a first time (step 210*d*); acquiring, from one or more data sources, a first set of terrain or structural information for a first area that includes the first estimated position (step 220*d*); determining, using the first set of information and the first estimated position, that the mobile device was within a structure at the first time (step 230*d*); determining a second estimated position of the mobile device that corresponds to a second location of the mobile device at a second time (step 240*d*); acquiring, if available, a second set of terrain or structural information for a second area that includes the second estimated position (step 250*d*); determining, using the second set of information and the second estimated position, that it is not possible to determine the mobile device was within a particular structure at the second time, or determining that terrain or structural information could not be acquired for the second time (step 260*d*); determining one or more values that are indicative of vertical movement by the mobile device during a period of time between the first time and the second time, wherein the one or more values are determined using altitudes of terrain at the latitude and longitude of the first estimated position and the latitude and longitude of the second estimated position, and one or both of (i) measurements of pressure from a pressure sensor of the mobile device or (ii) an amount of movement measured by an inertial sensor of the mobile device (step 270*d*); comparing the one or more values indicative of vertical movement to a set of one or more threshold conditions (step 280*d*); and determining the context of the mobile device based on one or more results of comparing the one or more values indicative of vertical movement to the set of one or more threshold conditions (step 290*d*). In one embodiment of step 270*d*, one or more values are determined by determining a value indicative of vertical movement that is a difference in terrain altitude between a first altitude of terrain at the latitude and longitude of the first estimated position and a second altitude of terrain at the latitude and longitude of the second estimated position, and further by: (a) determining a first value indicative of vertical movement that is a difference in pressure between a first measurement of pressure made by the pressure sensor of the mobile device at the first time and a second measurement of pressure made by the pressure sensor of the mobile device at the second time; (b) determining a second value indicative of vertical movement that is a rate of pressure change during the period of time; and/or (c) determining a third value indicative of vertical movement that is an amount of vertical acceleration measured by the inertial sensor of the mobile device during the period of time.

Figure 2E:
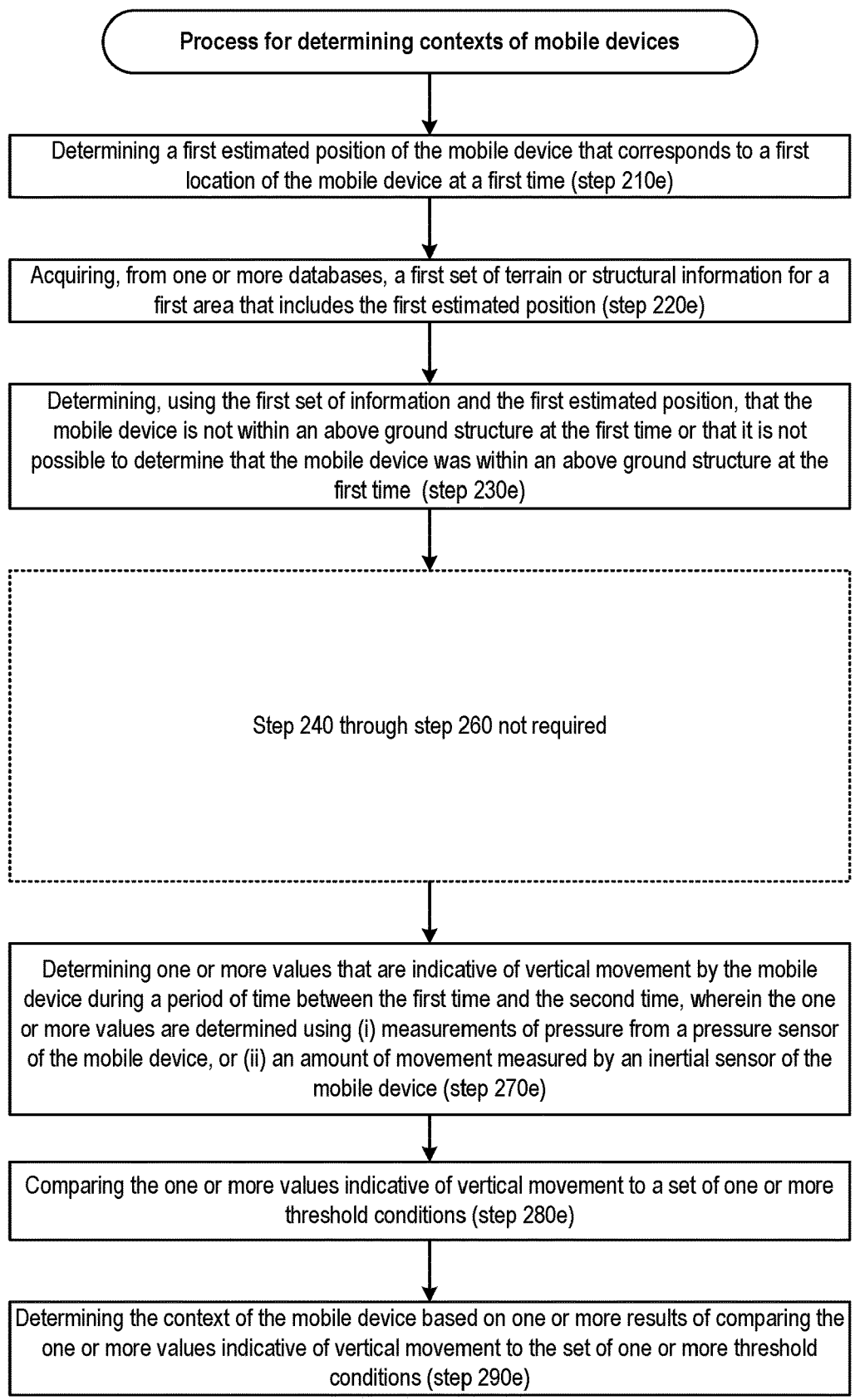

Another process is shown in FIG. 2E. The process of FIG. 2E can be used when the mobile device is not detected to be within a structure at a first time. When the mobile device is not detected to be within a structure at a first time, a context can be determined by testing a possibility that the mobile device is underground. FIG. 2E depicts a process for determining a context of a mobile device in connection with the following steps: determining a first estimated position of the mobile device that corresponds to a first location of the mobile device at a first time (step 210e); acquiring, from one or more data sources, a first set of terrain or structural information for a first area that includes the first estimated position (step 220e); determining, using the first set of information and the first estimated position, that the mobile device is not within an above ground structure at the first time or that it is not possible to determine that the mobile device was within an above ground structure at the first time (step 230e); determining one or more values that are indicative of vertical movement by the mobile device during a period of time between the first time and the second time, wherein the one or more values are determined using (i) measurements of pressure from a pressure sensor of the mobile device, or (ii) an amount of movement measured by an inertial sensor of the mobile device (step 270e); comparing the one or more values indicative of vertical movement to a set of one or more threshold conditions (step 280e); and determining the context of the mobile device based on one or more results of comparing the one or more values indicative of vertical movement to the set of one or more threshold conditions (step 290e). In different embodiments of step 270e, one or more values are determined by: (a) determining a first value indicative of vertical movement that is a difference in pressure between a first measurement of pressure made by the pressure sensor of the mobile device at the first time and a second measurement of pressure made by the pressure sensor of the mobile device at the second time; (b) determining a second value indicative of vertical movement that is a rate of pressure change during the period of time; and/or (c) determining a third value indicative of vertical movement that is an amount of vertical acceleration measured by the inertial sensor of the mobile device during the period of time.

Additional process flows showing different approaches for determining a particular context based on the types of structures (e.g., a generic category of structure like building or pathway, or a particular structure) determined in steps 230 and steps 260 are described below with respect to FIG. 3A through FIG. 3N. These process flows can be performed individually, collectively, or in any combination of two or more of the approaches. Each of the processes of FIG. 3A through FIG. 3M can be performed within each of the processes of FIG. 2A through FIG. 2C, where steps 370, 380 and 390 for each of the processes shown in FIG. 3A through FIG. 3M are embodiments of steps 270, 280 and 290 for each of the processes shown in FIG. 2A through FIG. 2C, and the determinations during steps 230 and 260 for each of the processes of FIG. 2A through FIG. 2C are specified in each of the processes shown in FIG. 3A through FIG. 3M. The process of FIGS. 3LA and 3LB can be performed within the process of FIG. 2D, where steps 3701, 3801 and 3901 are embodiments of steps 270d, 280d and 290d, respectively, and the determinations for steps 230d and 260d are specified in the process of FIG. 3L. The process of FIG. 3N can be performed within the process of FIG. 2E, where steps 370n, 380n and 390n are embodiments of steps 270e, 280e and 290e, respectively, and the determination for step 230e is specified in the process of FIG. 3N.

Mobile Device is within Same or Neighboring Buildings at First and Second Times

FIG. 3A depicts a sub-flow when a determination is made that the mobile device was within a particular building at the first time and a determination is made that the mobile device was within the particular building or a neighboring building at the second time.

During step 370a, the one or more values that are indicative of vertical movement include one or more of: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time.

During step 380a, comparing the one or more values to the set of one or more threshold conditions comprises one or more of: (a) determining if a magnitude of the difference in pressure (i) is above a first pressure difference threshold (e.g., 10 Pa) or (ii) is not above the first pressure difference threshold but is above a second pressure difference threshold (e.g., 5 Pa); (b) determining if a magnitude of the rate of pressure change (i) is above a first pressure change threshold (e.g., 10 Pa/s) or (ii) is not above the first pressure change threshold but is above a second pressure change threshold (e.g., 5 Pa/s); and/or (c) determining if a magnitude of the amount of vertical acceleration (i) is above a first vertical acceleration threshold (e.g., 1.0 m/s^2) or (ii) is not above the first vertical acceleration threshold but is above a second vertical acceleration threshold (e.g., 0.5 m/s^2).

During step 390a, determining the context of the mobile device based on one or more results of comparing the one or more values indicative of vertical movement to the set of one or more threshold conditions comprises one or more of: determining that the mobile device is on an elevator when the one or more results indicate one or more of (a) the magnitude of the difference in pressure is above the first pressure difference threshold, (b) the magnitude of the rate of pressure change is above the first pressure change threshold, and/or (c) the magnitude of the amount of vertical acceleration is above the first vertical acceleration threshold; and/or determining that the mobile device is on an escalator when the one or more results indicate one or more of (a) the magnitude of the difference in pressure is not above the first pressure difference threshold but is above the second pressure difference threshold, (b) the magnitude of the rate of pressure change is not above the first pressure change threshold but is above the second pressure change threshold, and/or (c) the magnitude of the amount of vertical acceleration is not above the first vertical acceleration threshold but is above the second vertical acceleration threshold. Optionally, when a determination is made that the mobile device was within a particular building at the first time, and the second determination does not specify that the mobile device was within the particular building or a neighboring building at the second time, a determination is made that the context cannot be determined.

Mobile Device is on Ramp

FIG. 3B depicts a sub-flow when a determination is made that the mobile device was within a generic pathway or a particular ramp at the first time and a determination is made that the mobile device was within the particular ramp at the second time.

During step 370b, the one or more values that are indicative of vertical movement includes one or more of: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time.

During step 380b, comparing the one or more values to the set of one or more threshold conditions comprises one or more of: (a) determining if a magnitude of the difference in pressure (i) is above a first pressure difference threshold (e.g., 10 Pa) or (ii) is not above the first pressure difference threshold but is above a second pressure difference threshold (e.g., 5 Pa); (b) determining if a magnitude of the rate of pressure change (i) is above a first pressure change threshold (e.g., 10 Pa/s) or (ii) is not above the first pressure change threshold but is above a second pressure change threshold (e.g., 5 Pa/s); and/or (c) determining if a magnitude of the amount of vertical acceleration (i) is above a first vertical acceleration threshold (e.g., 1.0 m/s^2) or (ii) is not above the first vertical acceleration threshold but is above a second vertical acceleration threshold (e.g., 0.5 m/s^2).

During step 390b, determining the context of the mobile device based on one or more results of comparing the one or more values indicative of vertical movement to the set of one or more threshold conditions comprises one or more of: determining that the mobile device is driving on a ramp (e.g., highway ramp) when the one or more results indicate one or more of (a) the magnitude of the difference in pressure is above the first pressure difference threshold, (b) the magnitude of the rate of pressure change is above the first pressure change threshold, and/or (c) the magnitude of the amount of vertical acceleration is above the first vertical acceleration threshold; or determining that the mobile device is walking on a ramp (e.g., along a roadway) when the one or more results indicate one or more of (a) the magnitude of the difference in pressure is not above the first pressure difference threshold but is above the second pressure difference threshold, (b) the magnitude of the rate of pressure change is not above the first pressure change threshold but is above the second pressure change threshold, and/or (c) the magnitude of the amount of vertical acceleration is not above the first vertical acceleration threshold but is above the second vertical acceleration threshold.

Mobile Device is on an Overpass/Bridge that Ascends Above Flat Terrain

FIG. 3C depicts a sub-flow when a determination is made that the mobile device was within a generic pathway or a particular bridge or overpass at the first time and a determination is made that the mobile device was within the particular bridge or overpass at the second time.

During step 370c, the one or more values that are indicative of vertical movement includes one or more of: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time.

During step 380c, comparing the one or more values to the set of one or more threshold conditions comprises one or more of: (a) determining if the difference in pressure is below a pressure difference threshold (e.g., −10 Pa); (b) determining if the rate of pressure change is below a pressure change threshold (e.g., −10 Pa/s); and/or (c) determining if the amount of vertical acceleration is above a vertical acceleration threshold (e.g., 1.0 m/s^2).

During step 390c, determining the context of the mobile device based on one or more results of comparing the one or more values indicative of vertical movement to the set of one or more threshold conditions comprises determining that the mobile device is on the particular bridge or overpass when the one or more results indicate one or more of (a) the difference in pressure is below the pressure difference threshold, (b) the rate of pressure change is below the pressure change threshold, and/or (c) the amount of vertical acceleration is above the vertical acceleration threshold.

Mobile Device is on an Underpass that Descends Below Flat Terrain

FIG. 3D depicts a sub-flow when a determination is made that the mobile device was within a generic pathway or a particular underpass at the first time, and a determination is made that the mobile device was within the particular underpass at the second time.

During step 370d, the one or more values that are indicative of vertical movement includes one or more of: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time.

During step 380d, comparing the one or more values to the set of one or more threshold conditions comprises one or more of: (a) determining if the difference in pressure is above a pressure difference threshold (e.g., 10 Pa); (b) determining if the rate of pressure change is above a pressure change threshold (e.g., 10 Pa/s); and/or (c) determining if the amount of vertical acceleration is below a vertical acceleration threshold (e.g., −1.0 m/s^2).

During step 390*d*, determining the context of the mobile device based on one or more results of comparing the one or more values indicative of vertical movement to the set of one or more threshold conditions comprises: determining that the mobile device is on the particular underpass when the one or more results indicate one or more of (a) the difference in pressure is above the pressure difference threshold, (b) the rate of pressure change is above the pressure change threshold, and/or (c) the amount of vertical acceleration is below the vertical acceleration threshold.

Mobile Device is on a Bridge/Overpass that Passes Over Descending Terrain

FIG. 3E depicts a sub-flow when a determination is made that the mobile device was within a generic pathway or a particular bridge or overpass at the first time, and a determination is made that the mobile device was within the particular bridge or overpass at the second time.

During step 370*e*, the one or more values that are indicative of vertical movement include: a value indicative of vertical movement that is a difference in terrain altitude between a first altitude of terrain at the latitude and longitude of the first estimated position and a second altitude of terrain at the latitude and longitude of the second estimated position.

During step 380*e*, comparing the one or more values to the set of one or more threshold conditions comprises: determining if the difference in terrain altitude is below a terrain altitude difference threshold (e.g., −5 m).

During step 390*e*, determining the context of the mobile device based on one or more results of comparing the one or more values indicative of vertical movement to the set of one or more threshold conditions comprises: determining that the mobile device is on the particular bridge or overpass when the one or more results indicate the difference in terrain altitude is below the terrain altitude difference threshold.

Mobile Device is on an Underpass that Passes Through Ascending Terrain

FIG. 3F depicts a sub-flow when a determination is made that the mobile device was within a generic pathway or a particular underpass at the first time, and a determination is made that the mobile device was within the particular underpass at the second time.

During step 370*f*, the one or more values that are indicative of vertical movement include: a value indicative of vertical movement that is a difference in terrain altitude between a first altitude of terrain at the latitude and longitude of the first estimated position and a second altitude of terrain at the latitude and longitude of the second estimated position.

During step 380*f*, comparing the one or more values to the set of one or more threshold conditions comprises: determining if the difference in terrain altitude is above a terrain altitude difference threshold (e.g., 5 m).

During step 390*f*, determining the context of the mobile device based on one or more results of comparing the one or more values indicative of vertical movement to the set of one or more threshold conditions comprises: determining that the mobile device is on the particular underpass when the one or more results indicate the difference in terrain altitude is above the terrain altitude difference threshold.

Mobile Device is on a Bridge/Overpass with Limited or No Understanding of Relative Variation of Terrain and the Structure FIG. 3G depicts a sub-flow when a determination is made that the mobile device was within a generic pathway or a particular bridge or overpass at the first time, and a determination is made that the mobile device was within the particular bridge or overpass at the second time.

During step 370*g*, the one or more values that are indicative of vertical movement includes one or more of: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; (c) a third value indicative of vertical movement that is an amount of vertical acceleration measured by the inertial sensor of the mobile device during the period of time; and/or (d) a fourth value indicative of vertical movement that is a difference in terrain altitude between a first altitude of terrain at the latitude and longitude of the first estimated position and a second altitude of terrain at the latitude and longitude of the second estimated position;

During step 380*g*, comparing the one or more values to the set of one or more threshold conditions comprises one or more of: (i) if the difference in pressure is below a first pressure difference threshold (e.g., −10 Pa) when the difference in terrain altitude is below a first terrain altitude difference threshold (e.g., 0 m), which may represent when terrain is not rising with the mobile device; (ii) if the difference in terrain altitude is below a second terrain altitude difference threshold (e.g., −5 m) when the difference in pressure is not below a second pressure difference threshold (e.g., 0 Pa), which may represent when the mobile device is not descending with terrain; (iii) if the rate of pressure change is below a first pressure change threshold (e.g., −10 Pa/s) when the difference in terrain altitude is below the first terrain altitude difference threshold, which may represent when terrain is not rising with the mobile device; (iv) if the difference in terrain altitude is below the second terrain altitude difference threshold when the rate of pressure change is not below a second pressure change threshold (e.g., 0 Pa/s), which may represent when the mobile device is not descending with terrain; (v) if the amount of vertical acceleration is above a first vertical acceleration threshold (e.g., 1 m/s^2) when the difference in terrain altitude is below the first terrain altitude difference threshold, which may represent when terrain is not rising with the mobile device; and/or (vi) if the difference in terrain altitude is below the second terrain altitude difference threshold when the amount of vertical acceleration is not below a second vertical acceleration threshold (e.g., 0 m/s^2), which may represent when the mobile device is not descending with terrain.

During step 390*g*, determining the context of the mobile device based on one or more results of comparing the one or more values indicative of vertical movement to the set of one or more threshold conditions comprises: determining that the mobile device is on the particular bridge or overpass when the one or more results indicate one or more of (i) the difference in pressure is below the first pressure difference threshold when the difference in terrain altitude is below the first terrain altitude difference threshold, (ii) the difference in terrain altitude is below a second terrain altitude difference threshold when the difference in pressure is not below the second pressure difference threshold, (iii) the rate of pressure change is below the first pressure change threshold when the difference in terrain altitude is below the first terrain altitude difference threshold, (iv) the difference in terrain altitude is below the second terrain altitude difference threshold when the rate of pressure change is not below the second pressure change threshold, (v) the amount of vertical acceleration is above the first vertical acceleration threshold when the difference in terrain altitude is below the first terrain altitude difference threshold, and/or (vi) the difference in terrain altitude is below the second terrain altitude difference threshold when the amount of vertical acceleration is not below the second vertical acceleration threshold.

Mobile Device is on an Underpass with Limited or No Understanding of Relative Variation of Terrain and the Structure FIG. 3H depicts a sub-flow when a determination is made that the mobile device was within a generic pathway or a particular underpass at the first time, and a determination is made that the mobile device was within the particular underpass at the second time.

During step 370h, the one or more values that are indicative of vertical movement includes one or more of: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; (c) a third value indicative of vertical movement that is an amount of vertical acceleration measured by the inertial sensor of the mobile device during the period of time; and/or (d) a fourth value indicative of vertical movement that is a difference in terrain altitude between a first altitude of terrain at the latitude and longitude of the first estimated position and a second altitude of terrain at the latitude and longitude of the second estimated position.

During step 380h, comparing the one or more values to the set of one or more threshold conditions comprises one or more of: (i) if the difference in pressure is above a first pressure difference threshold (e.g., 10 Pa) when the difference in terrain altitude is not below a first terrain altitude difference threshold (e.g., 0 m), which may represent when terrain is not descending with mobile device; (ii) if the difference in terrain altitude is above a second terrain altitude difference threshold (e.g., 5 m) when the difference in pressure is not above a second pressure difference threshold (e.g., 0 Pa), which may represent when the mobile device is not ascending with terrain; (iii) if the rate of pressure change is above a first pressure change threshold (e.g., 10 Pa/s) when the difference in terrain altitude is not below the first terrain altitude difference threshold, which may represent when terrain is not descending with mobile device; (iv) if the difference in terrain altitude is above the second terrain altitude difference threshold when the rate of pressure change is not above a second pressure change threshold (e.g., 0 Pa/s), which may represent when the mobile device is not ascending with terrain; (v) if the amount of vertical acceleration is below a first vertical acceleration threshold (e.g., −1 m/s^2) when the difference in terrain altitude is not below the first terrain altitude difference threshold, which may represent when terrain is not descending with the mobile device; and/or (vi) if the difference in terrain altitude is above the second terrain altitude difference threshold when the amount of vertical acceleration is not above a second vertical acceleration threshold (e.g., 0 m/s^2), which may represent when the mobile device is not ascending with terrain.

During step 390h, determining the context of the mobile device based on one or more results of comparing the one or more values indicative of vertical movement to the set of one or more threshold conditions comprises determining that the mobile device is on the underpass when the one or more results indicate one or more of (i) the difference in pressure is above the first pressure difference threshold when the difference in terrain altitude is not below the first terrain altitude difference threshold, (ii) the difference in terrain altitude is above a second terrain altitude difference threshold when the difference in pressure is not above the second pressure difference threshold, (iii) the rate of pressure change is above the first pressure change threshold when the difference in terrain altitude is not below the first terrain altitude difference threshold, (iv) the difference in terrain altitude is above the second terrain altitude difference threshold when the rate of pressure change is not above the second pressure change threshold, (v) the amount of vertical acceleration is below the first vertical acceleration threshold when the difference in terrain altitude is not below the first terrain altitude difference threshold, and/or (vi) the difference in terrain altitude is above the second terrain altitude difference threshold when the amount of vertical acceleration is not above the second vertical acceleration threshold.

Mobile Device is in a Tunnel that Descends Below Flat Terrain

FIG. 3I depicts a sub-flow when a determination is made that the mobile device was within a generic pathway or a particular tunnel at the first time, and a determination is made that the mobile device was within the particular tunnel at the second time.

During step 370i, the one or more values that are indicative of vertical movement includes one or more of: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time.

During step 380i, comparing the one or more values to the set of one or more threshold conditions comprises one or more of: (a) determining if the difference in pressure is above a pressure difference threshold (e.g., 10 Pa); (b) determining if the rate of pressure change is above a pressure change threshold (e.g., 10 Pa/s); and/or (c) determining if the amount of vertical acceleration is below a vertical acceleration threshold (e.g., −1.0 m/s^2).

During step 390i, determining the context of the mobile device based on one or more results of comparing the one or more values indicative of vertical movement to the set of one or more threshold conditions comprises determining that the mobile device is in the tunnel when the one or more results indicate one or more of (a) the difference in pressure is above the pressure difference threshold, (b) the rate of pressure change is above the pressure change threshold, or (c) the amount of vertical acceleration is below the vertical acceleration threshold.

Mobile Device is in a Tunnel that Passes Through Ascending Terrain

FIG. 3J depicts a sub-flow when a determination is made that the mobile device was within a generical pathway or a particular tunnel at the first time, and a determination is made that the mobile device was within the particular tunnel at the second time.

During step 370$j$, the one or more values that are indicative of vertical movement include: a value indicative of vertical movement that is a difference in terrain altitude between a first altitude of terrain at the latitude and longitude of the first estimated position and a second altitude of terrain at the latitude and longitude of the second estimated position.

During step 380$j$, comparing the one or more values to the set of one or more threshold conditions comprises: determining if the difference in terrain altitude is above a terrain altitude difference threshold (e.g., 5 m).

During step 390$j$, determining the context of the mobile device based on one or more results of comparing the one or more values indicative of vertical movement to the set of one or more threshold conditions comprises: determining that the mobile device is in the tunnel when the one or more results indicate the difference in terrain altitude is above the terrain altitude difference threshold.

Mobile Device is in a Tunnel Bridge with Limited or No Understanding of Relative Variation of Terrain and the Structure FIG. 3K depicts a sub-flow when a determination is made that the mobile device was within a generic pathway or a particular tunnel at the first time, and a determination is made that the mobile device was within the particular tunnel at the second time.

During step 370$k$, the one or more values that are indicative of vertical movement includes one or more of: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; (c) a third value indicative of vertical movement that is an amount of vertical acceleration measured by the inertial sensor of the mobile device during the period of time; and/or (d) a fourth value indicative of vertical movement that is a difference in terrain altitude between a first altitude of terrain at the latitude and longitude of the first estimated position and a second altitude of terrain at the latitude and longitude of the second estimated position.

During step 380$k$, comparing the one or more values to the set of one or more threshold conditions comprises one or more of: (i) if the difference in pressure is above a first pressure difference threshold (e.g., 10 Pa) when the difference in terrain altitude is not below a first terrain altitude difference threshold (e.g., 0 m), which may represent when terrain is not descending with mobile device; (ii) if the difference in terrain altitude is above a second terrain altitude difference threshold (e.g., 5 m) when the difference in pressure is not below a second pressure difference threshold (e.g., −10 Pa), which may represent when the mobile device is not ascending with terrain; (iii) if the rate of pressure change is above a first pressure change threshold (e.g., 10 Pa/s) when the difference in terrain altitude is not below the first terrain altitude difference threshold, which may represent when terrain is not descending with mobile device; (iv) if the difference in terrain altitude is above the second terrain altitude difference threshold when the rate of pressure change is not below a second pressure change threshold (e.g., −10 Pa/s), which may represent when the mobile device is not ascending with terrain; (v) if the amount of vertical acceleration is below a first vertical acceleration threshold (e.g., −1 m/s$^2$) when the difference in terrain altitude is not below the first terrain altitude difference threshold, which may represent when terrain is not descending with mobile device; and/or (vi) if the difference in terrain altitude is above the second terrain altitude difference threshold when the amount of vertical acceleration is not above a second vertical acceleration threshold (e.g., 0 m/s$^2$), which may represent when the mobile device is not ascending with terrain.

During step 390$k$, determining the context of the mobile device based on one or more results of comparing the one or more values indicative of vertical movement to the set of one or more threshold conditions comprises determining that the mobile device is in the tunnel when the one or more results indicate one or more of (i) the difference in pressure is above the first pressure difference threshold when the difference in terrain altitude is not below the first terrain altitude difference threshold, (ii) the difference in terrain altitude is above a second terrain altitude difference threshold when the difference in pressure is not below the second pressure difference threshold, (iii) the rate of pressure change is above the first pressure change threshold when the difference in terrain altitude is not below the first terrain altitude difference threshold, (iv) the difference in terrain altitude is above the second terrain altitude difference threshold when the rate of pressure change is not below the second pressure change threshold, (v) the amount of vertical acceleration is below the first vertical acceleration threshold when the difference in terrain altitude is not below the first terrain altitude difference threshold, and/or (vi) the difference in terrain altitude is above the second terrain altitude difference threshold when the amount of vertical acceleration is not above the second vertical acceleration threshold.

Type of Pathway is Unknown

FIGS. 3LA and 3LB depict a sub-flow when a determination is made that the mobile device was within a generic pathway at the first time, and a determination is made that the mobile device was within the generic pathway or that it is unknown if the mobile device was within the generic pathway at the second time.

During step 370$l$, the one or more values that are indicative of vertical movement includes one or more of: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; (c) a third value indicative of vertical movement that is an amount of vertical acceleration measured by the inertial sensor of the mobile device during the period of time; and/or (d) a fourth value indicative of vertical movement that is a difference in terrain altitude between a first altitude of terrain at the latitude and longitude of the first estimated position and a second altitude of terrain at the latitude and longitude of the second estimated position.

During step 380*l*, comparing the one or more values to the set of one or more threshold conditions comprises one or more of: (i) if the difference in terrain altitude is above a first terrain altitude difference threshold (e.g., 5 m) when a magnitude of the difference in pressure is below a first pressure difference threshold (e.g., 10 Pa), a magnitude of the rate of pressure change is below a first pressure change threshold (e.g., 10 Pa/s), or a magnitude of the amount of vertical acceleration is below a first vertical acceleration threshold (e.g., 1 m/s^2); (ii) if the difference in terrain altitude is above the first terrain altitude difference threshold when the difference in pressure is above a second pressure difference threshold (e.g., 10 Pa), the rate of pressure change is above a second pressure change threshold (e.g., 10 Pa/s), or the amount of vertical acceleration is below a second vertical acceleration threshold (e.g., −1 m/s^2); (iii) if the difference in terrain altitude is below a second terrain altitude difference threshold (e.g., −5 m) when the magnitude of the difference in pressure is below a third pressure difference threshold (e.g., 10 Pa), the magnitude of the rate of pressure change is below a third pressure change threshold (e.g., 10 Pa/s), or a magnitude of the amount of vertical acceleration is below a third vertical acceleration threshold (e.g., 1 m/s^2), where magnitude accounts for fluctuations of pressure stemming from a pressure sensor that does not significantly change; (iv) if the difference in terrain altitude is between the first terrain altitude difference threshold and the second terrain altitude difference threshold when the magnitude of the difference in pressure is above a fourth pressure difference threshold (e.g., 10 Pa), the magnitude of the rate of pressure change is above a fourth pressure change threshold (e.g., 10 Pa/s), or the magnitude of the amount of vertical acceleration is above a fourth vertical acceleration threshold (e.g., 1 m/s^2), where magnitude accounts for both ramps that go up from a road and ramps that go down from a road; and/or (v) if the difference in terrain altitude is between the first terrain altitude difference threshold and the second terrain altitude difference threshold when the difference in pressure is above a fifth pressure difference threshold (e.g., 10 Pa), the rate of pressure change is above a fifth pressure change threshold (e.g., 10 Pa/s), or the amount of vertical acceleration is below a fifth vertical acceleration threshold (e.g., −1 m/s^2).

During step 390*l*, determining the context of the mobile device based on one or more results of comparing the one or more values indicative of vertical movement to the set of one or more threshold conditions comprises determining that the mobile device is (i) in a tunnel when the one or more results indicate the difference in terrain altitude is above the first terrain altitude difference threshold when the magnitude of the difference in pressure is below the first pressure difference threshold, the magnitude of the rate of pressure change is below the first pressure change threshold, or the magnitude of the amount of vertical acceleration is below the first vertical acceleration threshold, (ii) on an underpass when the one or more results indicate the difference in terrain altitude is above the first terrain altitude difference threshold when the difference in pressure is above the second pressure difference threshold, the rate of pressure change is above the second pressure change threshold, or the amount of vertical acceleration is below a second vertical acceleration threshold, (iii) on a bridge/overpass when the one or more results indicate the difference in terrain altitude is below a second terrain altitude difference threshold when the magnitude of the difference in pressure is below the third pressure difference threshold, the magnitude of the rate of pressure change is below the third pressure change threshold, or the magnitude of the amount of vertical acceleration is below the third vertical acceleration threshold, (iv) on a ramp when the one or more results indicate the difference in terrain altitude is between the first terrain altitude difference threshold and the second terrain altitude difference threshold when the magnitude of the difference in pressure is above the fourth pressure difference threshold, the magnitude of the rate of pressure change is above the fourth pressure change threshold, or the magnitude of the amount of vertical acceleration is above the fourth vertical acceleration threshold, and/or (v) underground when the one or more results indicate the difference in terrain altitude is between the first terrain altitude difference threshold and the second terrain altitude difference threshold when the difference in pressure is above the fifth pressure difference threshold, the rate of pressure change is above the fifth pressure change threshold, or the amount of vertical acceleration is below the fifth vertical acceleration threshold.

Mobile Device Underground

FIG. 3M depicts a sub-flow when a determination is made that the mobile device was within a generic pathway at the first time, and a determination is made that the mobile device was within a generic or particular building at the second time.

During step 370*m*, the one or more values that are indicative of vertical movement includes one or more of: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time.

During step 380*m*, comparing the one or more values to the set of one or more threshold conditions comprises one or more of: (a) determining if the difference in pressure is above a pressure difference threshold (e.g., 5 Pa), which implies the mobile device is descending; (b) determining if the rate of pressure change is above a pressure change threshold (e.g., 5 Pa/s), which implies the mobile device is descending; and/or (c) determining if the amount of vertical acceleration is below a vertical acceleration threshold (e.g., −1.0 m/s^2), which implies the mobile device is descending.

During step 390*m*, determining the context of the mobile device based on one or more results of comparing the one or more values indicative of vertical movement to the set of one or more threshold conditions comprises: determining that the mobile device is underground when the one or more results indicate one or more of (a) the difference in pressure is above the pressure difference threshold, (b) the rate of pressure change is above the pressure change threshold, and/or (c) the amount of vertical acceleration is below the vertical acceleration threshold.

Mobile Device Underground

FIG. 3N depicts a sub-flow when a determination is made that the mobile device was not within a generic or particular building or a generic or particular pathway at the first time, which implies the mobile device was on outdoor ground terrain at the first time.

During step 370n, the one or more values that are indicative of vertical movement includes one or more of: (a) a first value indicative of vertical movement that is a difference in pressure between a first measurement of pressure made by the pressure sensor of the mobile device at the first time and a second measurement of pressure made by the pressure sensor of the mobile device at the second time; (b) a second value indicative of vertical movement that is a rate of pressure change during the period of time; and/or (c) a third value indicative of vertical movement that is an amount of vertical acceleration measured by the inertial sensor of the mobile device during the period of time.

During step 380n, comparing the one or more values to the set of one or more threshold conditions comprises one or more of: (a) determining if the difference in pressure is above a pressure difference threshold (e.g., 5 Pa); (b) determining if the rate of pressure change is above a pressure change threshold (e.g., 5 Pa/s); and/or (c) determining if the amount of vertical acceleration is below a vertical acceleration threshold (e.g., −1.0 m/s^2).

During step 390n, determining the context of the mobile device based on one or more results of comparing the one or more values indicative of vertical movement to the set of one or more threshold conditions comprises determining that the mobile device is underground when the one or more results indicate one or more of (a) the difference in pressure is above the pressure difference threshold, (b) the rate of pressure change is above the pressure change threshold, or (c) the amount of vertical acceleration is below the vertical acceleration threshold.

In some embodiments of the processes discussed above, a context is determined using two or more threshold comparisons to two or more corresponding determined values (e.g., pressure difference, rate of pressure change, vertical acceleration). In such embodiments, the conclusions from the threshold comparisons can be weighted equally or unequally to determine a confidence that the context is a particular context. For example, if a first conclusion from a first threshold comparison (e.g., the rate of pressure change is above the pressure change threshold) specifies a particular context (e.g., underground), but a second conclusion from a second threshold comparison (e.g., the amount of vertical acceleration is not below the vertical acceleration threshold) does not specify the particular context (e.g., underground inconclusive), then there is a 50% confidence of the particular context (e.g., underground). Alternatively, different weights can be used—e.g., if a first conclusion from a first threshold comparison has a 0.6 weight and specifies a particular context, but a second conclusion from a second threshold comparison has a 0.4 weight and does not specify the particular context, then there is a 60% confidence of the particular context. The determined confidence can be used to determine the type of context. For example, if the confidence exceeds a threshold confidence value (e.g., 50%, 75% or other value), then the particular context is the determined context, and if the confidence does not exceed the threshold confidence value, then the particular context is not the determined context. Alternatively, if two or more particular contexts are considered (e.g., if two or more or the processes shown in FIG. 3A through FIG. 3N are performed), then confidences for those particular context can be determined and the particular context with the highest confidence can be used as a final context value.

By way of example, different steps of the processes depicted in FIG. 2A through FIG. 3N may be performed by particular components, including implementations of embodiments where all steps are performed using one or more processing machines (e.g., server, a mobile device, a processor of a mobile device, and/or other type of controller). The steps of acquiring information may also use (i) communication pathways, (ii) data sources from which the information is acquired, and (iii) interfaces of a server and/or a mobile device from which requests for the information are sent and at which the information is received from the data sources.

Other Aspects

Any method (also referred to as a "process" or an "approach") described or otherwise enabled by disclosure herein may be implemented by hardware components (e.g., machines), software modules (e.g., stored in machine-readable media), or a combination thereof. In particular, any method described or otherwise enabled by disclosure herein may be implemented by any concrete and tangible system described herein. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media, including but not limited to one or more non-volatile or volatile storage media, removable or non-removable media, integrated circuit media, magnetic storage media, optical storage media, or any other storage media, including RAM, ROM, and EEPROM, that may be patented under the laws of the jurisdiction in which this application is filed, but does not include machine-readable media that cannot be patented under the laws of the jurisdiction in which this application is filed (e.g., transitory propagating signals). Methods disclosed herein provide sets of rules that are performed. Systems that include one or more machines and one or more non-transitory machine-readable media for implementing any method described herein are also contemplated herein. One or more machines that perform or implement, or are configured, operable or adapted to perform or implement operations comprising the steps of any methods described herein are also contemplated herein. Each method described herein that is not prior art represents a specific set of rules in a process flow that provides significant advantages in the field of determining contexts of mobile devices. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

Figure 4:
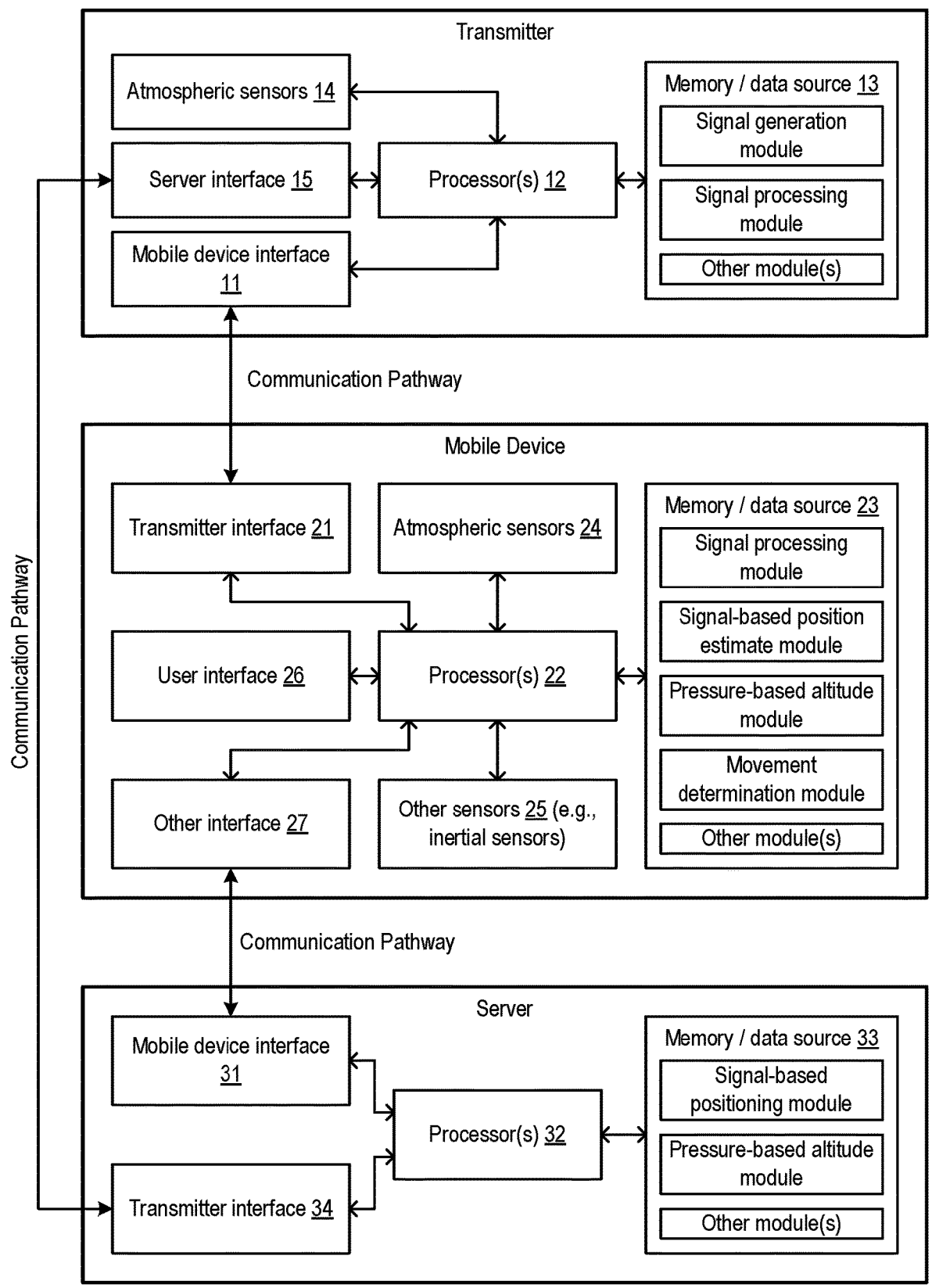
FIG. 4 illustrates components of a transmitter, a mobile device, and a server.

Attention is returned to FIG. 1, which shows a network of terrestrial transmitters 110, at least one mobile device 120, and a server 130. Each of the transmitters 110 and the mobile device 120 may be located at different altitudes or depths that are inside or outside various natural or manmade structures (e.g. buildings) 190. Positioning signals 113 and 153 are respectively transmitted from the transmitters 110 and the satellites 150, and received by the mobile device 120 using known transmission technologies. The transmitters 110 may transmit the signals 113 using one or more common multiplexing parameters—e.g. time slot, pseudorandom sequence, frequency offset, or other, as is known in the art or otherwise disclosed herein. The mobile device 120 may take different forms, including a mobile phone or other wireless communication device, a portable computer, a navigation device, a tracking device, a receiver, or another suitable device that can receive the signals 113 and/or 153. Examples of possible components in the transmitters 110, the mobile device 120, and the server 130 are shown in FIG. 4, which illustrates components of a transmitter, a mobile device, and a server. Examples of communication pathways are shown by arrows between components. In particular, each transmitter 110 may include atmospheric sensors (e.g., a pressure and temperature sensors) for generating measurements of atmospheric conditions (e.g., pressure and temperature) that are used to estimate an unknown altitude of the mobile device 120.

By way of example in FIG. 4, each of the transmitters may include: a mobile device interface 11 for exchanging information with a mobile device (e.g., antenna(s) and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, humidity, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example FIG. 4, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 4, the server may include: a mobile device interface 31 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Determining the exact location of a mobile device (e.g., a smart phone operated by a user) in an environment can be quite challenging, especially when the mobile device is located in an urban environment or is located within a building. Imprecise estimates of the mobile device's altitude, for example, may have life or death consequences for the user of the mobile device since the imprecise altitude estimate can delay emergency personnel response times as they search for the user on multiple floors of a building. In less dire situations, imprecise altitude estimates can lead a user to the wrong area in an environment.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. Pub. No. 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

Different approaches exist for estimating an altitude of a mobile device. In a barometric-based positioning system, altitude can be computed using a measurement of pressure from a calibrated pressure sensor of a mobile device along with ambient pressure measurement(s) from a network of calibrated reference pressure sensors and a measurement of ambient temperature from the network or other source. An estimate of an altitude of a mobile device ($h_{mobile}$) can be computed by the mobile device, a server, or another machine that receives needed information as follows:

$$h_{mobile} = h_{sensor} - \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device by a pressure sensor of the mobile device, $P_{sensor}$ is an estimate of pressure at the location of a reference pressure sensor that is accurate to within a tolerated amount of pressure from true pressure (e.g., less than 5 Pa), $T_{remote}$ is an estimate of temperature (e.g., in Kelvin) at the location of the reference pressure sensor or a different location of a remote temperature sensor, $h_{sensor}$ is an estimated altitude of the reference pressure sensor that is estimated to within a desired amount of altitude error (e.g., less than 1.0 meters), g corresponds to the acceleration due to gravity (e.g., −9.8 m/s$^2$), R is a gas constant, and M is molar mass of air (e.g., dry air or other). The minus sign (−) may be substituted with a plus sign (+) in alternative embodiments of Equation 1, as would be understood by one of ordinary skill in the art (e.g., g=9.8 m/s$^2$). The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor. The reference-level pressure can be determined as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the reference pressure sensor, $P_{ref}$ is the reference-level pressure estimate, and $h_{ref}$ is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

This application relates to the following related application(s): U.S. Pat. Appl. No. 62/891,069, filed 2019 Aug. 23, entitled SYSTEMS AND METHODS FOR DETERMINING CONTEXTS OF MOBILE DEVICES. The content of each of the related application(s) is hereby incorporated by reference herein in its entirety.

What is claimed is:

1. A method comprising:
   determining a first estimated position of a mobile device at a first time;

acquiring, from one or more data sources, a first set of terrain or structural information for a first area that includes the first estimated position;

determining, using the first set of terrain or structural information and the first estimated position, that the mobile device was near or within a structure at the first time;

determining a second estimated position of the mobile device at a second time;

acquiring, from the one or more data sources, a second set of terrain or structural information for a second area that includes the second estimated position;

determining, using the second set of terrain or structural information and the second estimated position, that the mobile device was near or within the structure at the second time;

determining one or more values indicative of vertical movement by the mobile device during a period of time between the first time and the second time, wherein the one or more values indicative of vertical movement are determined using measurements of pressure from a pressure sensor of the mobile device;

comparing the one or more values indicative of vertical movement to a set of one or more threshold conditions; and determining a context of the mobile device based on one or more results of comparing the one or more values indicative of vertical movement to the set of one or more threshold conditions.

2. The method of claim 1, wherein:

determining if the mobile device was near or within the structure at the first time comprises determining that the mobile device was near or within a building at the first time;

determining if the mobile device was near or within the structure at the second time comprises determining that the mobile device was near or within the building at the second time;

determining one or more values indicative of vertical movement comprises one or more of: (a) determining a difference in pressure between a first measurement of pressure made by the pressure sensor of the mobile device at the first time and a second measurement of pressure made by the pressure sensor of the mobile device at the second time, or (b) determining a rate of pressure change during the period of time;

comparing the one or more values indicative of vertical movement to the set of one or more threshold conditions comprises one or more of: (a) determining if a magnitude of the difference in pressure is above a first pressure difference threshold, or (b) determining if a magnitude of the rate of pressure change is above a first pressure change threshold; and determining the context comprises determining that the mobile device is on an elevator when the one or more results indicate one or more of: (a) the magnitude of the difference in pressure is above the first pressure difference threshold, or (b) the magnitude of the rate of pressure change is above the first pressure change threshold.

3. The method of claim 1, wherein:

determining if the mobile device was near or within the structure at the first time comprises determining that the mobile device was near or within a building at the first time;

determining if the mobile device was near or within the structure at the second time comprises determining that the mobile device was near or within the building or a neighboring building at the second time;

determining one or more values indicative of vertical movement comprises one or more of: (a) determining a difference in pressure between a first measurement of pressure made by the pressure sensor of the mobile device at the first time and a second measurement of pressure made by the pressure sensor of the mobile device at the second time, or (b) determining a rate of pressure change during the period of time;

comparing the one or more values indicative of vertical movement to the set of one or more threshold conditions comprises one or more of: (a) determining if a magnitude of the difference in pressure is not above a first pressure difference threshold but is above a second pressure difference threshold, or (b) determining if a magnitude of the rate of pressure change is not above a first pressure change threshold but is above a second pressure change threshold; and determining the context comprises determining that the mobile device is on an escalator when the one or more results indicate one or more of: (a) the magnitude of the difference in pressure is not above the first pressure difference threshold but is above the second pressure difference threshold, or (b) the magnitude of the rate of pressure change is not above the first pressure change threshold but is above the second pressure change threshold.

4. The method of claim 1, wherein:

determining if the mobile device was near or within the structure at the first time comprises determining that the mobile device was near or within a ramp at the first time;

determining if the mobile device was near or within the structure at the second time comprises determining that the mobile device was near or within the ramp at the second time;

determining one or more values indicative of vertical movement comprises one or more of: (a) determining a difference in pressure between a first measurement of pressure made by the pressure sensor of the mobile device at the first time and a second measurement of pressure made by the pressure sensor of the mobile device at the second time, or (b) determining a rate of pressure change during the period of time;

comparing the one or more values indicative of vertical movement to the set of one or more threshold conditions comprises one or more of: (a) determining if a magnitude of the difference in pressure is above a first pressure difference threshold, or (b) determining if a magnitude of the rate of pressure change is above a first pressure change threshold; and determining the context comprises determining that the mobile device is moving on the ramp via a motorized vehicle when the one or more results indicate one or more of (a) the magnitude of the difference in pressure is above the first pressure difference threshold, or (b) the magnitude of the rate of pressure change is above the first pressure change threshold.

5. The method of claim 1, wherein:

determining if the mobile device was near or within the structure at the first time comprises determining that the mobile device was near or within a ramp at the first time;

determining if the mobile device was near or within the structure at the second time comprises determining that the mobile device was near or within the ramp at the second time;

determining one or more values indicative of vertical movement comprises one or more of: (a) determining a difference in pressure between a first measurement of pressure made by the pressure sensor of the mobile device at the first time and a second measurement of pressure made by the pressure sensor of the mobile device at the second time, or (b) determining a rate of pressure change during the period of time;

comparing the one or more values indicative of vertical movement to the set of one or more threshold conditions comprises one or more of: (a) determining if a magnitude of the difference in pressure is not above a first pressure difference threshold but is above a second pressure difference threshold, or (b) determining if a magnitude of the rate of pressure change is not above a first pressure change threshold but is above a second pressure change threshold; and determining the context comprises determining that the mobile device is with a user who is walking on the ramp when the one or more results indicate one or more of (a) the magnitude of the difference in pressure is not above the first pressure difference threshold but is above the second pressure difference threshold, or (b) the magnitude of the rate of pressure change is not above the first pressure change threshold but is above the second pressure change threshold.

6. The method of claim 1, wherein:

determining if the mobile device was near or within the structure at the first time comprises determining that the mobile device was near or within a bridge or an overpass at the first time;

determining if the mobile device was near or within a structure at the second time comprises determining that the mobile device was near or within the bridge or the overpass at the second time;

determining one or more values indicative of vertical movement comprises one or more of: (a) determining a difference in pressure between a first measurement of pressure made by the pressure sensor of the mobile device at the first time and a second measurement of pressure made by the pressure sensor of the mobile device at the second time, or (b) determining a rate of pressure change during the period of time;

comparing the one or more values indicative of vertical movement to the set of one or more threshold conditions comprises one or more of: (a) determining if the difference in pressure is below a pressure difference threshold, (b) determining if the rate of pressure change is below a pressure change threshold; and determining the context comprises determining that the mobile device is on the bridge or the overpass when the one or more results indicate one or more of: (a) the difference in pressure is below the pressure difference threshold, or (b) the rate of pressure change is below the pressure change threshold.

7. The method of claim 1, wherein:

determining if the mobile device was near or within the structure at the first time comprises determining that the mobile device was near or within an underpass at the first time;

determining if the mobile device was near or within the structure at the second time comprises determining that the mobile device was near or within the underpass at the second time;

determining one or more values indicative of vertical movement comprises one or more of: (a) determining a difference in pressure between a first measurement of pressure made by the pressure sensor of the mobile device at the first time and a second measurement of pressure made by the pressure sensor of the mobile device at the second time, or (b) determining a rate of pressure change during the period of time;

comparing the one or more values indicative of vertical movement to the set of one or more threshold conditions comprises one or more of: (a) determining if the difference in pressure is above a pressure difference threshold, or (b) determining if the rate of pressure change is above a pressure change threshold; and determining the context comprises determining that the mobile device is on the underpass when the one or more results indicate one or more of: (a) the difference in pressure is above the pressure difference threshold, or (b) the rate of pressure change is above the pressure change threshold.

8. The method of claim 1, wherein:

determining if the mobile device was near or within the structure at the first time comprises determining that the mobile device was near or within a pathway or a bridge or an overpass at the first time;

determining if the mobile device was near or within the structure at the second time comprises determining that the mobile device was near or within the bridge or the overpass at the second time;

the one or more values indicative of vertical movement are further determined using altitudes of terrain at the first estimated position and the second estimated position;

determining one or more values indicative of vertical movement comprises one or more of: (a) determining a difference in pressure between a first measurement of pressure made by the pressure sensor of the mobile device at the first time and a second measurement of pressure made by the pressure sensor of the mobile device at the second time, (b) determining a rate of pressure change during the period of time, or (c) determining a difference in terrain altitude between a first altitude of terrain at the first estimated position and a second altitude of terrain at the second estimated position;

comparing the one or more values indicative of vertical movement to the set of one or more threshold conditions comprises one or more of: (i) determining if the difference in pressure is below a first pressure difference threshold when the difference in terrain altitude is below a first terrain altitude difference threshold, (ii) determining if the difference in terrain altitude is below a second terrain altitude difference threshold when the difference in pressure is not below a second pressure difference threshold, (iii) determining if the rate of pressure change is below a first pressure change threshold when the difference in terrain altitude is below the first terrain altitude difference threshold, or (iv) determining if the difference in terrain altitude is below the second terrain altitude difference threshold when the rate of pressure change is not below a second pressure change threshold; and determining the context comprises determining that the mobile device is on the bridge or the overpass when the one or more results indicate one or more of: (i) the difference in pressure is below the first pressure difference threshold when the difference in terrain altitude is below the first terrain altitude difference threshold, (ii) the difference in terrain altitude is below a second terrain altitude difference threshold when the difference in pressure is not below the second pressure difference threshold, (iii) the rate of pressure change is below the first pressure change threshold when the difference in terrain altitude is below the first terrain altitude difference threshold, or (iv) the difference in terrain altitude is below the second terrain altitude difference threshold when the rate of pressure change is not below the second pressure change threshold.

9. The method of claim 1, wherein:

determining if the mobile device was near or within the structure at the first time comprises determining that the mobile device was near or within an underpass at the first time;

determining if the mobile device was near or within the structure at the second time comprises determining that the mobile device was near or within the underpass at the second time;

the one or more values indicative of vertical movement are further determined using altitudes of terrain at the first estimated position and the second estimated position;

determining one or more values indicative of vertical movement comprises one or more of: (a) determining a difference in pressure between a first measurement of pressure made by the pressure sensor of the mobile device at the first time and a second measurement of pressure made by the pressure sensor of the mobile device at the second time, (b) determining a rate of pressure change during the period of time, or (c) determining a difference in terrain altitude between a first altitude of terrain at the first estimated position and a second altitude of terrain at the second estimated position;

comparing the one or more values indicative of vertical movement to the set of one or more threshold conditions comprises one or more of: (i) determining if the difference in pressure is above a first pressure difference threshold when the difference in terrain altitude is not below a first terrain altitude difference threshold, (ii) determining if the difference in terrain altitude is above a second terrain altitude difference threshold when the difference in pressure is not above a second pressure difference threshold, (iii) determining if the rate of pressure change is above a first pressure change threshold when the difference in terrain altitude is not below the first terrain altitude difference threshold, or (iv) determining if the difference in terrain altitude is above the second terrain altitude difference threshold when the rate of pressure change is not above a second pressure change threshold; and determining the context comprises determining that the mobile device is on the underpass when the one or more results indicate one or more of: (i) the difference in pressure is above the first pressure difference threshold when the difference in terrain altitude is not below the first terrain altitude difference threshold, (ii) the difference in terrain altitude is above the second terrain altitude difference threshold when the difference in pressure is not above the second pressure difference threshold, (iii) the rate of pressure change is above the first pressure change threshold when the difference in terrain altitude is not below the first terrain altitude difference threshold, or (iv) the difference in terrain altitude is above the second terrain altitude difference threshold when the rate of pressure change is not above the second pressure change threshold.

10. The method of claim 1, wherein:

determining if the mobile device was near or within the structure at the first time comprises determining that the mobile device was near or within a tunnel at the first time;

determining if the mobile device was near or within the structure at the second time comprises determining that the mobile device was near or within the tunnel at the second time;

determining one or more values indicative of vertical movement comprises one or more of: (a) determining a difference in pressure between a first measurement of pressure made by the pressure sensor of the mobile device at the first time and a second measurement of pressure made by the pressure sensor of the mobile device at the second time, or (b) determining a rate of pressure change during the period of time;

comparing the one or more values indicative of vertical movement to the set of one or more threshold conditions comprises one or more of: (a) determining if the difference in pressure is above a pressure difference threshold, or (b) determining if the rate of pressure change is above a pressure change threshold; and determining the context comprises determining that the mobile device is in the tunnel when the one or more results indicate one or more of: (a) the difference in pressure is above the pressure difference threshold, or (b) the rate of pressure change is above the pressure change threshold.

11. The method of claim 1, wherein:

determining if the mobile device was near or within the structure at the first time comprises determining that the mobile device was near or within a pathway or a tunnel at the first time;

determining if the mobile device was near or within the structure at the second time comprises determining that the mobile device was near or within the tunnel at the second time;

the one or more values indicative of vertical movement are further determined using altitudes of terrain at the first estimated position and the second estimated position;

determining one or more values indicative of vertical movement comprises one or more of: (a) determining a difference in pressure between a first measurement of pressure made by the pressure sensor of the mobile device at the first time and a second measurement of pressure made by the pressure sensor of the mobile device at the second time, (b) determining a rate of pressure change during the period of time, or (c) determining a difference in terrain altitude between a first altitude of terrain at the first estimated position and a second altitude of terrain at the second estimated position;

comparing the one or more values indicative of vertical movement to the set of one or more threshold conditions comprises one or more of: (i) determining if the difference in pressure is above a first pressure difference threshold when the difference in terrain altitude is not below a first terrain altitude difference threshold, (ii) determining if the difference in terrain altitude is above a second terrain altitude difference threshold when the difference in pressure is not below a second pressure difference threshold, (iii) determining if the rate of pressure change is above a first pressure change threshold when the difference in terrain altitude is not below the first terrain altitude difference threshold, or (iv) determining if the difference in terrain altitude is above the second terrain altitude difference threshold when the rate of pressure change is not below a second pressure change threshold; and determining the context comprises determining that the mobile device is in the tunnel when the one or more results indicate one or more of: (i) the difference in pressure is above the first pressure difference threshold when the difference in terrain altitude is not below the first terrain altitude difference threshold, (ii) the difference in terrain altitude is above a second terrain altitude difference threshold when the difference in pressure is not below the second pressure difference threshold, (iii) the rate of pressure change is above the first pressure change threshold when the difference in terrain altitude is not below the first terrain altitude difference threshold, or (iv) the difference in terrain altitude is above the second terrain altitude difference threshold when the rate of pressure change is not below the second pressure change threshold.

12. The method of claim 1, wherein:

determining if the mobile device was near or within the structure at the first time comprises determining that the mobile device was near or within a pathway at the first time;

determining if the mobile device was near or within the structure at the second time comprises determining that the mobile device was near or within the pathway or that it is unknown if the mobile device was near or within the pathway at the second time;

determining one or more values indicative of vertical movement comprises one or more of: (a) determining a difference in pressure between a first measurement of pressure made at the first time and a second measurement of pressure made at the second time by the pressure sensor of the mobile device, (b) determining a rate of pressure change during the period of time, or (c) determining a difference in terrain altitude between a first altitude at the first estimated position and a second altitude at the second estimated position;

comparing the one or more values indicative of vertical movement to the set of one or more threshold conditions comprises one or more of: (i) determining if the difference in terrain altitude is above a first terrain altitude difference threshold when a magnitude of the difference in pressure is below a first pressure difference threshold or a magnitude of the rate of pressure change is below a first pressure change threshold, (ii) determining if the difference in terrain altitude is above the first terrain altitude difference threshold when the difference in pressure is above a second pressure difference threshold or the rate of pressure change is above a second pressure change threshold, (iii) determining if the difference in terrain altitude is below a second terrain altitude difference threshold when the magnitude of the difference in pressure is below a third pressure difference threshold or the magnitude of the rate of pressure change is below a third pressure change threshold, where the magnitude of the difference in pressure or the magnitude of the rate of pressure change accounts for fluctuations of pressure stemming from a pressure sensor that does not significantly change, (iv) determining if the difference in terrain altitude is between the first terrain altitude difference threshold and the second terrain altitude difference threshold when the magnitude of the difference in pressure is above a fourth pressure difference threshold or the magnitude of the rate of pressure change is above a fourth pressure change threshold, where the magnitude of the difference in pressure or the magnitude of the rate of pressure change accounts for both ramps that go up from a road and ramps that go down from a road, or (v) determining if the difference in terrain altitude is between the first terrain altitude difference threshold and the second terrain altitude difference threshold when the difference in pressure is above a fifth pressure difference threshold or the rate of pressure change is above a fifth pressure change threshold; and determining the context comprises determining that the mobile device is one of: (i) in a tunnel when the difference in terrain altitude is above the first terrain altitude difference threshold when the magnitude of the difference in pressure is below the first pressure difference threshold or the magnitude of the rate of pressure change is below the first pressure change threshold, (ii) on an underpass when the difference in terrain altitude is above the first terrain altitude difference threshold when the difference in pressure is above the second pressure difference threshold or the rate of pressure change is above the second pressure change threshold, (iii) on a bridge or an overpass when the difference in terrain altitude is below a second terrain altitude difference threshold when the magnitude of the difference in pressure is below the third pressure difference threshold or the magnitude of the rate of pressure change is below the third pressure change threshold, (iv) on a ramp when the difference in terrain altitude is between the first terrain altitude difference threshold and the second terrain altitude difference threshold when the magnitude of the difference in pressure is above the fourth pressure difference threshold or the magnitude of the rate of pressure change is above the fourth pressure change threshold, or (v) underground when the difference in terrain altitude is between the first terrain altitude difference threshold and the second terrain altitude difference threshold when the difference in pressure is above the fifth pressure difference threshold or the rate of pressure change is above the fifth pressure change threshold.

13. The method of claim 1, wherein:

determining if the mobile device was near or within the structure at the first time comprises determining that the mobile device was near or within a pathway at the first time;

determining if the mobile device was near or within the structure at the second time comprises determining that the mobile device was near or within a building at the second time;

determining one or more values indicative of vertical movement comprises one or more of: (a) determining a difference in pressure between a first measurement of pressure made by the pressure sensor of the mobile device at the first time and a second measurement of pressure made by the pressure sensor of the mobile device at the second time, or (b) determining a rate of pressure change during the period of time;

comparing the one or more values indicative of vertical movement to the set of one or more threshold conditions comprises one or more of: (a) determining if the difference in pressure is above a pressure difference threshold, or (b) determining if the rate of pressure change is above a pressure change threshold; and determining the context comprises determining that the mobile device is underground when the one or more results indicate one or more of: (a) the difference in pressure is above the pressure difference threshold, or (b) the rate of pressure change is above the pressure change threshold.

14. The method of claim 1, wherein:

determining if the mobile device was near or within the structure at the first time comprises determining that the mobile device was not near or within a building or a pathway at the first time;

determining one or more values indicative of vertical movement comprises one or more of: (a) determining a difference in pressure between a first measurement of pressure made by the pressure sensor of the mobile device at the first time and a second measurement of pressure made by the pressure sensor of the mobile device at the second time, or (b) determining a rate of pressure change during the period of time;

comparing the one or more values indicative of vertical movement to the set of one or more threshold conditions comprises one or more of: (a) determining if the difference in pressure is above a pressure difference threshold, or (b) determining if the rate of pressure change is above a pressure change threshold; and determining the context comprises determining that the mobile device is underground when the one or more results indicate one or more of: (a) the difference in pressure is above the pressure difference threshold, or (b) the rate of pressure change is above the pressure change threshold.

15. One or more non-transitory machine-readable media embodying program instructions that, when executed by one or more machines, cause the one or more machines to implement the method of claim 1.

16. A system for determining contexts of mobile devices, comprising: a pressure sensor; an inertial sensor; and one or more machines that are coupled to the pressure sensor and the inertial sensor, and configured to perform the method of claim 1.

17. A method comprising:

determining a first estimated position of a mobile device at a first time;

acquiring, from one or more data sources, a first set of terrain or structural information for a first area that includes the first estimated position;

determining, using the first set of terrain or structural information and the first estimated position, that the mobile device was near or within a structure at the first time;

determining a second estimated position of the mobile device at a second time;

acquiring, from the one or more data sources, a second set of terrain or structural information for a second area that includes the second estimated position;

determining, using the second set of terrain or structural information and the second estimated position, that the mobile device was near or within the structure at the second time;

determining one or more values indicative of vertical movement by the mobile device during a period of time between the first time and the second time, wherein the one or more values indicative of vertical movement are determined using altitudes of terrain at the first estimated position and the second estimated position;

comparing the one or more values indicative of vertical movement to a set of one or more threshold conditions; and determining a context of the mobile device based on one or more results of comparing the one or more values indicative of vertical movement to the set of one or more threshold conditions.

18. The method of claim 17, wherein:

determining if the mobile device was near or within the structure at the first time comprises determining that the mobile device was near or within a bridge or an overpass at the first time;

determining if the mobile device was near or within the structure at the second time comprises determining that the mobile device was near or within the bridge or the overpass at the second time;

determining one or more values indicative of vertical movement comprises determining a value indicative of vertical movement that is a difference in terrain altitude between a first altitude of terrain at the first estimated position and a second altitude of terrain at the second estimated position;

comparing the one or more values indicative of vertical movement to the set of one or more threshold conditions comprises determining if the difference in terrain altitude is below a terrain altitude difference threshold; and determining the context comprises determining that the mobile device is on the bridge or the overpass when the one or more results indicate the difference in terrain altitude is below the terrain altitude difference threshold.

19. The method of claim 17, wherein:

determining if the mobile device was near or within the structure at the first time comprises determining that the mobile device was near or within an underpass at the first time;

determining if the mobile device was near or within the structure at the second time comprises determining that the mobile device was near or within the underpass at the second time;

determining one or more values indicative of vertical movement comprises determining a value indicative of vertical movement that is a difference in terrain altitude between a first altitude of terrain at the first estimated position and a second altitude of terrain at the second estimated position;

comparing the one or more values indicative of vertical movement to the set of one or more threshold conditions comprises determining if the difference in terrain altitude is above a terrain altitude difference threshold; and determining the context comprises determining that the mobile device is on the underpass when the one or more results indicate the difference in terrain altitude is above the terrain altitude difference threshold.

20. The method of claim 17, wherein:

determining if the mobile device was near or within the structure at the first time comprises determining that the mobile device was near or within a tunnel at the first time;

determining if the mobile device was near or within the structure at the second time comprises determining that the mobile device was near or within the tunnel at the second time;

determining one or more values indicative of vertical movement comprises determining a value indicative of vertical movement that is a difference in terrain altitude between a first altitude of terrain at the first estimated position and a second altitude of terrain at the second estimated position;

comparing the one or more values indicative of vertical movement to the set of one or more threshold conditions comprises determining if the difference in terrain altitude is above a terrain altitude difference threshold; and determining the context comprises determining that the mobile device is in the tunnel when the one or more results indicate the difference in terrain altitude is above the terrain altitude difference threshold.

* * * * *